US011682201B2

(12) United States Patent
Porcel Magnusson

(10) Patent No.: US 11,682,201 B2
(45) Date of Patent: Jun. 20, 2023

(54) IDENTIFYING TARGETS WITHIN IMAGES

(71) Applicant: SKANSENSE S.L.U., Madrid (ES)

(72) Inventor: Cristina Porcel Magnusson, Madrid (ES)

(73) Assignee: SKANSENSE S.L.U., Madrid (ES)

( * ) Notice: Subject to any disclaimer, the term of this patent is extended or adjusted under 35 U.S.C. 154(b) by 7 days.

(21) Appl. No.: 16/608,135

(22) PCT Filed: Apr. 25, 2018

(86) PCT No.: PCT/EP2018/060640
§ 371 (c)(1),
(2) Date: Oct. 24, 2019

(87) PCT Pub. No.: WO2018/197585
PCT Pub. Date: Nov. 1, 2018

(65) Prior Publication Data
US 2021/0012508 A1 Jan. 14, 2021

(30) Foreign Application Priority Data

Apr. 26, 2017 (EP) .................................... 17382225
Oct. 24, 2017 (EP) .................................... 17382709

(51) Int. Cl.
*G06V 20/10* (2022.01)
*G06T 7/11* (2017.01)
(Continued)

(52) U.S. Cl.
CPC .............. *G06V 20/176* (2022.01); *G06T 7/11* (2017.01); *G06T 7/194* (2017.01); *G06V 30/248* (2022.01);
(Continued)

(58) Field of Classification Search
CPC . G06K 2009/00644; G06K 2009/6864; G06K 2209/21; G06K 9/00637;
(Continued)

(56) References Cited

U.S. PATENT DOCUMENTS 9,057,712 B1 6/2015 Fraser
9,086,484 B2 * 7/2015 Medasani ............ G06V 10/768
(Continued)

OTHER PUBLICATIONS

International Search Report and Written Opinion dated Jul. 30, 2018 for Application No. PCT/EP2018/060640, 15 pages.
(Continued)

*Primary Examiner* — Bobbak Safaipour
(74) *Attorney, Agent, or Firm* — Fresh IP PLC; Clifford D. Hyra; Aubrey Y. Chen

(57) ABSTRACT

Methods of detecting and/or identifying an artificial target within an image are provided. These methods comprise: applying to a region of the image a primary classification algorithm for performing a feature extraction of the image region, the primary classification algorithm being based on a spectral profile defined by one or more spectral signatures with one or more features in at least part of the infrared spectrum; obtaining a relation between the extracted features of the image region and the spectral profile; verifying whether a level of confidence of the obtained relation between the extracted features and the spectral profile is higher than a first predetermined confirmation level; and, in case of positive (or true) result of said verification, determining that the image region corresponds to artificial target to be detected, thereby obtaining a confirmed artificial target. Systems and computer programs are also provided that are suitable for performing said methods.

26 Claims, 6 Drawing Sheets

(51) Int. Cl.
*G06T 7/194* (2017.01)
*G06V 30/24* (2022.01)

(52) U.S. Cl.
CPC .. *G06T 2207/10036* (2013.01); *G06V 20/194* (2022.01); *G06V 30/2528* (2022.01); *G06V 2201/07* (2022.01)

(58) Field of Classification Search
CPC .... G06K 9/3233; G06K 9/6202; G06K 9/685; G06T 2207/10036; G06T 7/11; G06T 7/194
See application file for complete search history.

(56) References Cited

U.S. PATENT DOCUMENTS

| | | | | |
|---|---|---|---|---|
| 10,235,589 | B2* | 3/2019 | Hawes | G06V 10/25 |
| 11,079,278 | B1* | 8/2021 | Bogacz | G06F 18/00 |
| 11,521,740 | B2* | 12/2022 | Abrami | G06N 7/00 |
| 2010/0288910 | A1 | 11/2010 | Robinson et al. | |
| 2012/0035884 | A1* | 2/2012 | Ingram | G06F 17/18 |
| | | | | 702/181 |
| 2015/0103341 | A1* | 4/2015 | Buehler | G06V 20/17 |
| | | | | 356/303 |
| 2015/0370255 | A1* | 12/2015 | Harvey | G05D 1/0297 |
| | | | | 701/24 |
| 2016/0069743 | A1* | 3/2016 | McQuilkin | A22B 5/007 |
| | | | | 356/416 |
| 2016/0247407 | A1* | 8/2016 | Paczan | B64C 39/024 |
| 2016/0328838 | A1 | 11/2016 | Kwan et al. | |
| 2017/0361726 | A1* | 12/2017 | Widmer | G01S 19/45 |
| 2018/0088048 | A1* | 3/2018 | Dong | C12Q 1/6825 |
| 2018/0306923 | A1* | 10/2018 | Porcel Magnusson | |
| | | | | G01S 17/89 |
| 2020/0237229 | A1* | 7/2020 | Fei | A61B 5/14546 |
| 2020/0317373 | A1* | 10/2020 | Salerno, Jr. | G01N 21/35 |
| 2020/0349375 | A1* | 11/2020 | Quigley | H04M 1/72454 |
| 2021/0012508 | A1* | 1/2021 | Porcel Magnusson | G06T 7/11 |
| 2022/0076444 | A1* | 3/2022 | Liu | G06V 20/58 |
| 2022/0196880 | A1* | 6/2022 | Lofftus | D06P 1/44 |

OTHER PUBLICATIONS

Li, Q., et al: "Detection of physical defects in solar cells by hyperspectral imaging technology", Optics & Laser Technology, vol. 42, No. 6, pp. 1010-1013, Sep. 1, 2010; XP026925056, ISSN: 0030-3992, DOI: 10.1016/J.OPTLASTEC.2010.01.022 [retrieved on Jan. 29, 2010].

* cited by examiner

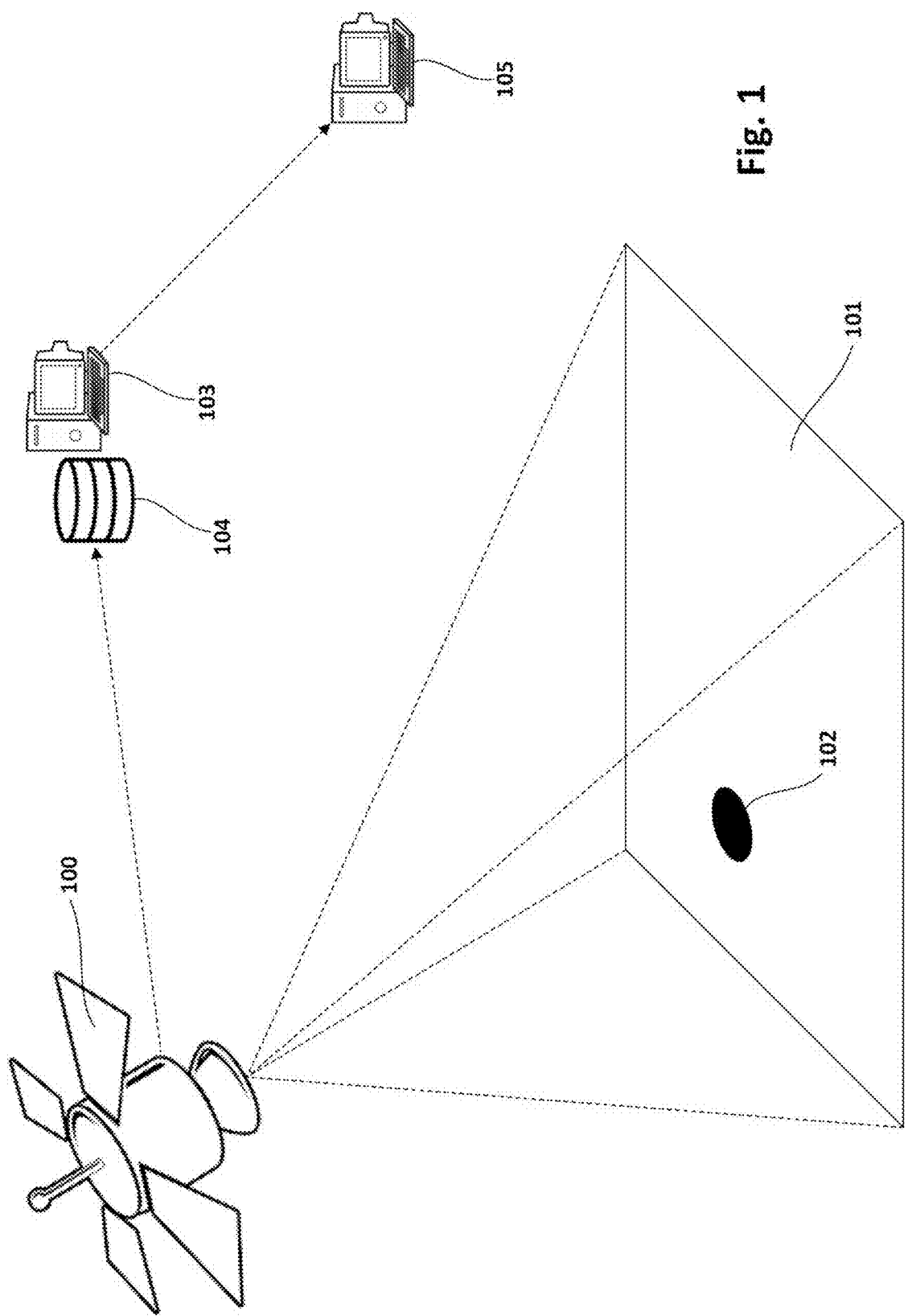

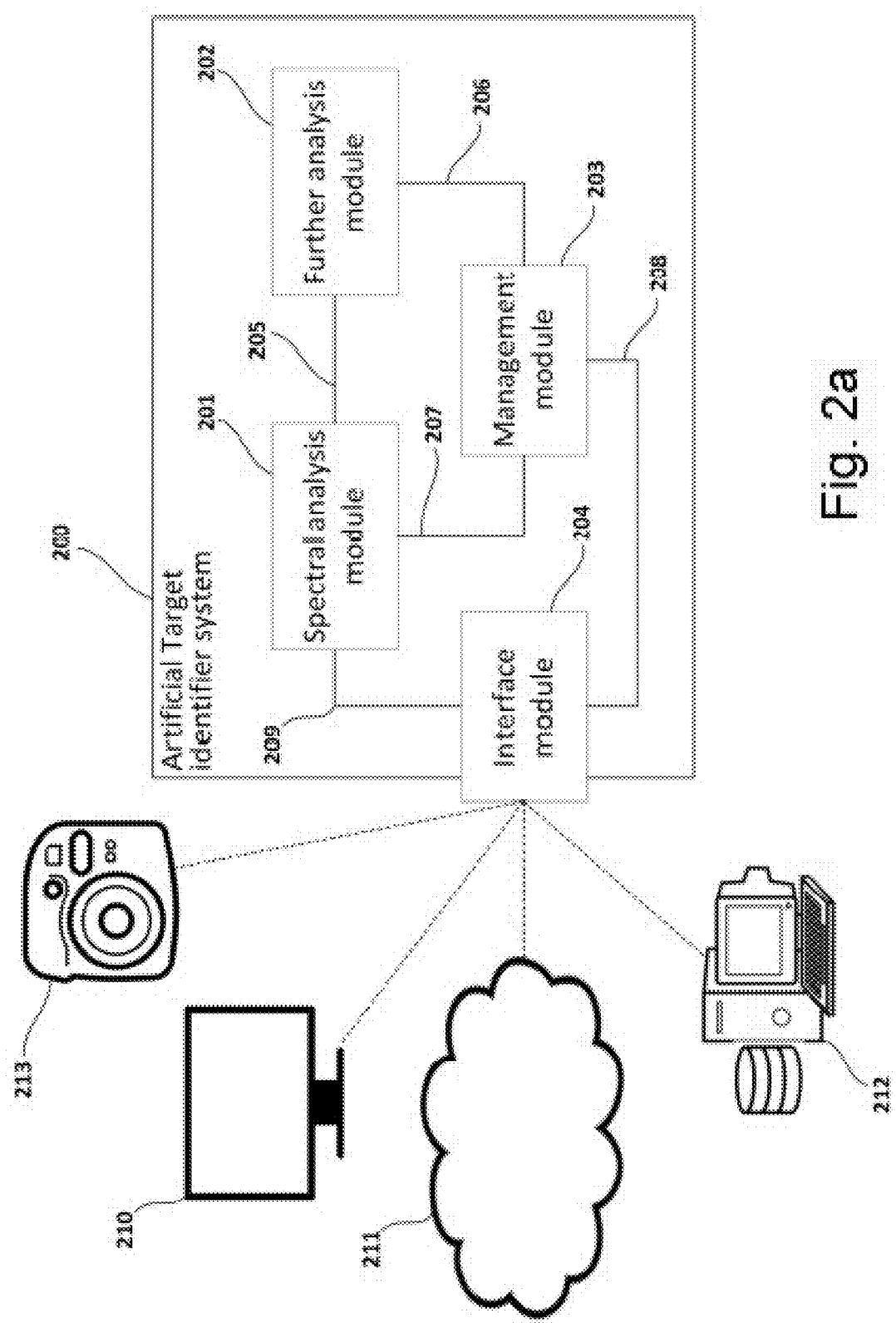

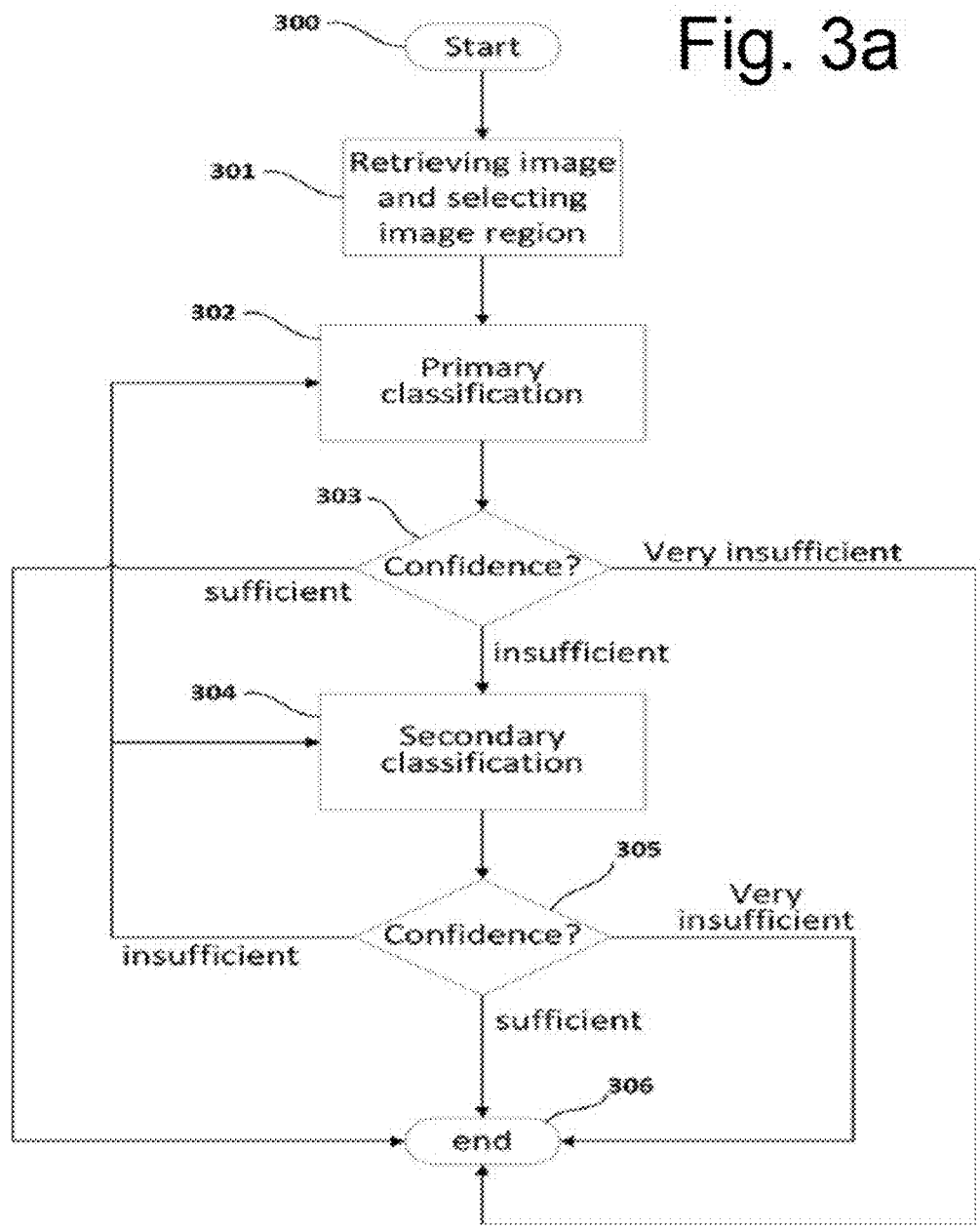

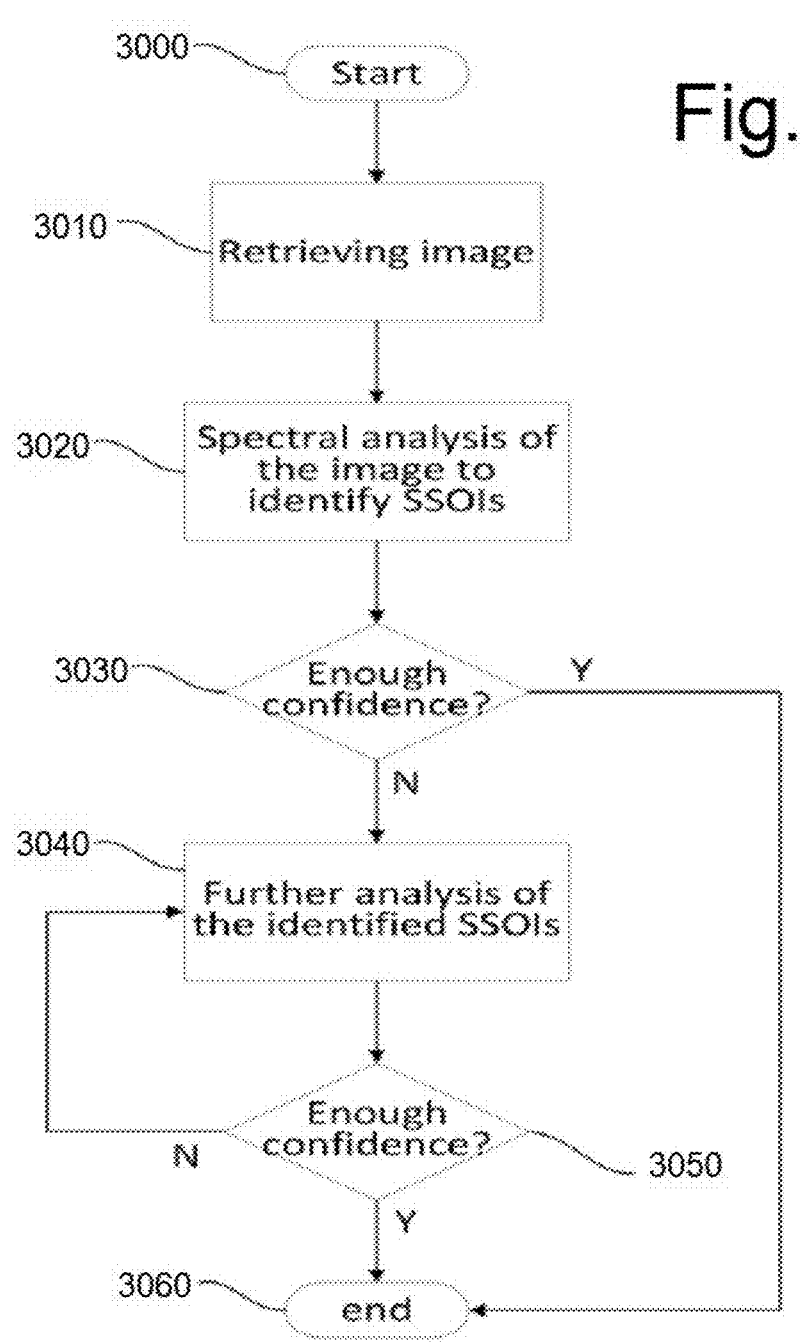

IDENTIFYING TARGETS WITHIN IMAGES

This application is a 35 U.S.C. 371 filing of International Application No. PCT/EP2018/060640, filed on 25 Apr. 2018, which claims priority to and the benefit of European Patent Application EP 17382709.8 filed on 24 Oct. 2017, and European Patent Application EP 17382225.5, filed on 26 Apr. 2017, all of which are incorporated verbatim herein by reference in their entirety, including the specifications, drawings, and the claims.

The present disclosure relates to methods of detecting a target within an image, and to systems, computer systems and computer programs suitable for performing such methods. The present disclosure further relates to methods of detecting an artificial target within an image, and to systems and computer programs suitable for performing such methods.

BACKGROUND

A digital image may comprise a plurality of pixels. A pixel may be generally thought of as the smallest single component of a digital image.

Each pixel may be seen as a sample of an original image; more samples typically provide more accurate representations of the original image. The intensity of each pixel may be variable. A colour may be represented by three or four component intensities such as red, green, and blue, or cyan, magenta, yellow and black. Other approaches are also possible, such as e.g. at the level of sub-pixels, based on pixels proximity (relations between nearby pixels), based on combining e.g. pixel and region features, etc.

Image analysis may be performed based on a diversity of techniques or algorithms that may comprise detecting and isolating various desired portions (regions of interest, ROI) or shapes (features) of a digitized image. This may be achieved by extracting meaningful information (features) from pixels in the image. Image analysis may thus require processing large amounts of data and, hence, complex computations.

Image analysis may be used to detect and/or identify an artificial target within an image by inspecting the image at the level of e.g. pixels, subpixels, relations between neighbour pixels, etc. This inspection may normally comprise evaluating various features associated to the image or parts of the image, such as e.g. colour, intensity, position, texture, etc.

In the present disclosure the terms detection and identification will be used indistinctly and should be interpreted for both applications.

Known target identification methods seem to be excessively computationally demanding and, therefore, their efficiency may represent a drawback that needs to be dealt with and solved, or at least attenuated.

An object of the present disclosure is to improve the prior art systems, methods and computer programs aimed at identifying an artificial target within an image.

SUMMARY

In an aspect, a method of detecting an artificial target within an image is provided. The method comprises applying to the image region a primary classification algorithm for performing a feature extraction of the image region. The primary classification algorithm is based on a spectral profile defined by one or more spectral signatures with one or more features in at least part of the infrared spectrum.

The method further comprises obtaining a relation between the one or more extracted features of the image region and the spectral profile. The method still further comprises verifying if a first level of confidence (LoC) of the obtained relation between the one or more extracted features and the spectral profile is higher than a first predetermined confirmation level. In case of positive (or true) result of said verification, the image region is determined as corresponding to an artificial target to be detected, thereby obtaining a confirmed artificial target.

An artificial target may be defined as any object manufactured or constructed or modified by a human being. Accordingly, a natural object whose original spectral properties have been modified such as e.g. a rock in a mountain that has been painted (by a person) may be considered as an artificial target. Any type of artificial vehicle, such as e.g. a ship, a car, etc. and/or infrastructure, construction materials, products, etc. may also be considered as an artificial target to be detected in the context of methods according to the present disclosure.

The image region may be selected from the image (which may be comprised in previously acquired imagery, in image databases and/or real-time acquisition) depending on predefined selection criteria, which may depend on the (type of) artificial target to be detected. Predefined selection criteria may also include selecting the image region randomly. The proposed method may be performed repetitively considering a different selected image region in every iteration of the method, until the whole (or most of the) image has been processed. The selection criteria may comprise e.g. dividing the image into a plurality of regions in a grid-based manner and scanning said grid so that a different region of the grid is processed in each execution of the method. The regions of such a grid may have different sizes and shapes as long as the whole (or most of the) image is covered by the grid. Any known principles or criteria aimed at splitting an image in portions for its full (or almost full) processing at portion level and/or also at pixel level may be used.

The method may further comprise verifying whether the first level of confidence or LoC (of the relation between the extracted features and the spectral profile) is lower than a first predetermined minimum acceptance level. In case of positive (or true) result of said verification, the first LoC may be assumed as excessively insufficient and the image region may be determined as corresponding to background of the image. In this case, the image region may be directly discarded in the sense that the image region will not be further processed to detect the artificial target.

If the first LoC is higher than (or equal to) the first predetermined minimum acceptance level but lower than (or equal to) the first predetermined confirmation level, the first LoC may be assumed as not excessively insufficient and, therefore, the image region may be further processed. This further processing may be in terms of e.g. repeating the primary classification according to different configuration or parameters, or applying to the image region a secondary classification based on spectral and non-spectral features.

In the option of repeating the primary classification, iterations of the primary classification may comprise spectrally analysing the image region depending on different spectral parameters, and/or may comprise spatially analysing pixels of the image region, etc. Once primary classification has been repeated under particular conditions, relation between extracted features and spectral profile and corresponding first LoC may be determined depending on particular results derived from that particular execution of the primary classification.

Spatial analysis of pixels may comprise one of the following techniques: spatial neighbourhood analysis, spatial down-sampling, binning analysis, any other proximity analysis aimed at spatially correlating the pixels in the image region. Any combination of said techniques may also be used. The spatial analysis may be suitably combined with the aforementioned spectral-based analysis (e.g. in different iterations of the primary classification) to spatially correlate the spectral properties of the pixels and/or to improve the accuracy of methods according to the present disclosure.

If the spectral analysis determines that the image region includes pixels defining spectrally outlier features but the spatial analysis concludes that said pixels are scattered/ungrouped in the image region, the image region may be qualified as less likely to be (or include) the artificial target due to the dispersion detected by the spatial analysis. On the contrary, if the spatial analysis determines that said pixels are grouped, the image region may be qualified as more likely to be (or include) the artificial target due to the concentration detected by the spatial analysis.

The spectral analysis may also conclude that the image region includes pixels defining (extracted) spectral features highly corresponding to the spectral profile (which may correspond to e.g. coatings/materials causing identifiable spectral conditions), and the spatial analysis may conclude that said pixels are scattered or ungrouped in the image region. In this case, the image region may be qualified as less likely to be (or include) the artificial target due to the dispersion detected by the spatial analysis. On the contrary, if the spatial analysis concludes that said pixels are grouped, the image region may be qualified as more likely to be (or include) the artificial target due to the concentration detected by the spatial analysis.

In the option of transitioning from primary to secondary classification, the application to the image region of the secondary classification may be based on spectral and/or non-spectral features to detect the artificial target within the image region. A second LoC of the application of the secondary classification may be determined and, then, it may be verified whether said second LoC is higher than a second predetermined confirmation level. In case of positive or true result of said verification, the image region may be determined as corresponding to the artificial target, thereby obtaining a confirmed artificial target. The secondary classification may further take into account data produced by primary classification previously applied to the image region.

The second LoC may be obtained based on same or similar principles commented before with respect to the first level of confidence, but in this case depending on the secondary classification. If the second LoC is lower than a second predetermined minimum acceptance level, the second LoC may be assumed as excessively insufficient and the image region may be determined as corresponding to background of the image. In this case, the image region may be discarded in the sense that the image region will not be further processed to detect the artificial target.

If the second LoC is higher than (or equal to) the second predetermined minimum acceptance level but lower than (or equal to) the second predetermined confirmation level, the first LoC may be assumed as not excessively insufficient and, therefore, the image region may be further processed. This further processing may be in terms of e.g. applying again the primary classification to the image region according to different configuration or parameters (e.g. not considered so far), or applying again the secondary classification to the image region according to different configuration or parameters (e.g. not considered so far). Further application of the primary classification may take into account data resulting from previous application(s) of the secondary classification. Further application of the secondary classification may take into account data resulting from previous application(s) of the secondary classification.

Once further primary classification has been performed, first LoC may be determined corresponding to said further primary classification. Once further secondary classification has been performed, second LoC may be determined corresponding to said further secondary classification. Any of said first and second LoC may be used to evaluate whether the image region may be assumed as being or including the artificial target, in the same or similar manner as described before.

Primary and/or secondary classifications may be executed at pixel level, i.e. pixel by pixel, forming the image region. Furthermore, in primary and/or secondary classifications, metadata may be used to enrich the processing of the image region according to principles described in other parts of the present disclosure.

The (one or more) spectral signatures defining the spectral profile may correspond to e.g. a particular coating or material (e.g. paint) causing identifiable spectral conditions. Spectral signatures may be stored in the form of e.g. tags in a spectral library or database which may consulted by any of the classification algorithms. Spectral signature(s) may also be extracted from the image itself as described in other parts of the disclosure. Spectral signature(s) may thus correspond to a (pre-known) tag or to a (detected) anomaly such as e.g. a spectral anomaly (e.g. outlier pixels). Said tag and anomaly may be related to coating, sticker or material (e.g. causing identifiable spectral conditions).

These identifiable coatings may have been used to paint corresponding entity (e.g. vehicle, ship, aircraft, product, etc.) or group of entities (e.g. vehicle model, ship or aircraft fleet, product batch, etc.) in order to facilitate automated detection, identification and/or processing. Said entity or group of entities may be identified when required by performing a method of detecting an artificial target according to the present disclosure.

The spectral profile defined by one or more spectral signatures (with one or more features in at least part of the infrared spectrum) may be extracted from the image itself (to which the image region belongs). In this case, the one or more spectral signatures may include spectral values obtained from the whole (or most of the) image. A spectral value may be e.g. an average, a mean, a median, a combination thereof, etc. corresponding to all or most of pixels forming the image.

In any of the primary and secondary classification, predefined spectral data (corresponding to e.g. a particular coating or material with spectral properties in the infrared) may be obtained and the spectral profile may be extracted (further or only) depending on said predefined spectral data. The spectral profile (extracted from the image and/or predefined spectral data) may be used as training data in e.g. a machine learning process aimed at training any of the primary and secondary classification. Predefined spectral training data may comprise e.g. one or more tags, one or more predefined spectral signatures, one or more spectral features, etc. The spectral profile used by any of the primary and secondary classification may thus be associated to the predefined spectral training data.

In the case of the secondary classification, predefined non-spectral data may be also obtained, so that the profile may be extracted further depending on said predefined non-spectral data. The predefined non-spectral data may comprise any of texture data and geometric data. Geometric data may include any of size data and shape data.

Secondary classification may comprise Artificial Intelligence (e.g. machine learning) techniques. Artificial Intelligence may be implemented based on machine learning algorithms which may be supervised, unsupervised or semi-supervised. Machine learning algorithms may use predefined spectral training data which may comprise predefined spectral signatures (or tags). Predefined spectral training data may be associated with the spectral profile(s). Neural networks are an example of machine learning algorithms that may be used with acceptable results.

The primary classification may be a "soft" classifier and the secondary classification may be a "deep" classifier, so that the primary classification has a computational cost significantly lower than the secondary classification. In some examples, the primary classification may not use Artificial Intelligence/machine learning (e.g. primary classification may include spectral mapping without machine learning) and the secondary classification may be a classification using Artificial Intelligence/machine learning. In other examples, the primary classification may be a classification with non-deep machine learning and the secondary classification may be a classification based on Neural Networks and deep machine learning.

A low deviation or high correspondence between the extracted features and the spectral profile may likely denote that the image region is (or comprises) the artificial target. Otherwise, the image region may be considered as not likely being (or comprising) the artificial target. The lower is the deviation or the higher is the correspondence between the extracted features and the spectral profile, the higher may result the first level of confidence (of the relation between the extracted features and the spectral profile) and conversely.

The extracted features of the image region and the spectral profile may be compared to each other for determining a relation between them. This relation may be e.g. a deviation or a correspondence between the extracted features and the spectral profile. The determination of this relation between the extracted features and the spectral profile may further produce the first level of confidence (of said relation). The primary classification may further include said determination of the relation between the extracted features and the spectral profile and the corresponding first level of confidence.

If the spectral profile has its origin in the image itself, a high deviation or low correspondence between the extracted features and the spectral profile may likely denote that the image region comprises an outlier or spectrally anomalous region with respect to the whole (or most of the) image. In this case, the image region may be considered as likely being or including the artificial target. Otherwise, the image region may be considered as likely being part of a background of the image. The lower is the deviation or the higher is the correspondence between the extracted features and the spectral profile, the lower may result the first level of confidence (of the relation between the extracted features and the spectral profile) and conversely.

In some examples, it may also be provided a (integrity) method of verifying the integrity of a confirmed artificial target obtained by any of the previous methods of detecting an artificial target within an image. This integrity method may comprise applying to the confirmed artificial target the primary classification algorithm for determining if the confirmed artificial target comprises a discontinuity in its spectral signature. The primary classification algorithm may be based on spectral and spatial analysis. If it is determined that the confirmed artificial target comprises a discontinuity, it may be verified whether a third level of confidence of the determined discontinuity is higher than a third predetermined confirmation level. In case of positive or true result of said verification, the integrity method may further comprise determining that the determined discontinuity (comprised in the confirmed artificial target) corresponds to a confirmed discontinuity.

The integrity method may further comprise verifying whether the third level of confidence (LoC) of the determined discontinuity (comprised in the confirmed artificial target) is higher than a third predetermined confirmation level. If the third LoC is higher than the third predetermined confirmation level, metadata may be assigned to at least one of the image and the image region. If the third LoC is higher than the third predetermined confirmation level, a warning indicating the presence of the confirmed discontinuity may be generated.

The integrity method may further comprise verifying whether the third level of confidence (LoC) of the determined discontinuity (comprised in the confirmed artificial target) is lower than a third predetermined minimum acceptance level. If the third LoC is lower than the third predetermined minimum acceptance level, the determined discontinuity comprised in the confirmed artificial target is assumed or qualified as unconfirmed discontinuity. If the third LoC is lower than the third predetermined minimum acceptance level, metadata may be assigned to at least one of the image and the image region for enrichment purposes.

The integrity method may further comprise verifying whether the third LoC is higher than (or equal to) the third predetermined minimum acceptance level but lower than (or equal to) the third predetermined confirmation level. In case of positive or true result of said verification, the secondary classification algorithm may be applied to the confirmed artificial target based on spectral and/or non-spectral features. The secondary classification may be configured, in this case, to verify (or confirm) the determined discontinuity in the confirmed artificial target. The secondary classification algorithm may be applied to the confirmed artificial target taking into account data resulting from applying to the confirmed artificial target the primary classification algorithm.

If a fourth LoC of said application of the secondary classification to the confirmed artificial target is higher than a fourth predetermined confirmation level, the determined discontinuity in the confirmed artificial target may be assumed or qualified as confirmed discontinuity. If the fourth LoC is higher than the fourth predetermined confirmation level, a warning indicating the presence of the confirmed discontinuity may be generated. If the fourth LoC is higher than the fourth predetermined confirmation level, metadata may be assigned to at least one of the image and the image region for enrichment purposes.

If the fourth LoC is lower than a fourth predetermined minimum acceptance level, the discontinuity comprised in the confirmed artificial target may be determined as unconfirmed discontinuity. If the fourth LoC is lower than the fourth predetermined minimum acceptance level, metadata may be assigned to at least one of the image and the image region.

If the fourth LoC is higher than the fourth predetermined minimum acceptance level but lower than the fourth predetermined confirmation level, the primary classification algorithm may be applied again to the confirmed artificial target.

Said further application of the primary classification algorithm to the confirmed artificial target may take into account data resulting from previous application(s) of the secondary classification algorithm to the confirmed artificial target. If the fourth LoC is higher than the fourth predetermined minimum acceptance level but lower than the fourth predetermined confirmation level, metadata may be assigned to at least one of the image and the image region. If the fourth LoC is higher than the fourth predetermined minimum acceptance level but lower than the fourth predetermined confirmation level, the secondary classification may be applied again to the confirmed artificial target based on other spectral and/or non-spectral features (e.g. not used so far).

The method may further comprise applying a third algorithm configured to control processes of the execution of the method. This third algorithm may be configured to control any of the level of confidence, changes in level of confidence, level of confidence of integrity check, associating metadata, iterations of the primary classification algorithm, iterations of the secondary classification algorithm, balance of the usage of the primary and secondary classification algorithms.

In some examples, a (finding) method may be provided to find a confirmed artificial target detected by executing any of the previously described methods of detecting a target within an image. This finding method may comprise receiving a query based on input data, and returning a result relating to output data. Input data may comprise at least one of: tag data, spectral data, ROI, POI, ToA (Time of Acquisition), metadata. Output data may comprise at least one of: tag data, spectral data, ROI, POI, ToA, metadata. The query may comprise any Boolean combination of data.

In the methods described herein, metadata may be used to enrich the processing of the image region by either the primary classification or the secondary classification, or both. This enrichment may be implemented and achieved according to principles described in other parts of the description.

In any of the methods described herein, the primary classification and/or the secondary classification may be executed according to search and locate mode, scan mode, change monitoring mode, etc. These modes are described in detail in other parts of the disclosure. The primary classification and/or the secondary classification may be executed as a compression tool, as a dimensionality reduction tool, etc.

A classification algorithm performed as a compression tool refers to that said classification (significantly) reduces the amounts of data to be processed by a next classification. As commented in other parts of the disclosure, an image (to be analysed) may be divided into a plurality of image regions which may be individually processed by corresponding classification. This classification may be seen as a compression tool in the sense that some of the image regions may be definitely qualified as target or background by said classification and are not sent to a next classification for further processing. The amount of data to be processed by the next classification has thus been reduced (or compressed). This compression approach may be very advantageous in implementations in which data outputted by one classification is sent or transmitted to a remote site wherein another classification is performed. Since the data outputted by the one classification may be highly reduced in comparison with the entire image, this transmission of data may result significantly optimized.

In any of the methods described herein, the primary classification and/or the secondary classification may be executed as on-board processing, ground segment processing, remote processing, etc. On-board processing may refer to that classification is performed at the same site dedicated to acquire the image(s) to be analysed. Ground segment processing may refer to that classification is performed at a ground site or station. Remote processing may refer to that classification is performed at a site remotely located with respect to image acquirer device.

In any of the methods described in present disclosure, the primary classification and/or the secondary classification may be executed in real time, non-real time, near real time, etc. Real time means that classification is performed with minimum delay or not appreciable delay with respect to previous process (e.g. image acquisition or previous classification). Non-real time means that classification is performed with clearly appreciable delay with respect to previous process (e.g. image acquisition or previous classification). Near real time means that classification is performed with slightly appreciable delay with respect to previous process (e.g. image acquisition or previous classification).

In the methods previously described, different predefined acceptance and confirmation levels (or thresholds) are used to qualify corresponding LoC as enough, not enough, absolutely insufficient, etc. Then, depending on the qualified LoC, the image region is assumed as being or including the artificial target, being or including background of the image, being or including a candidate to be the artificial target (i.e. to be further processed), etc. All these acceptance and confirmation levels or thresholds may have predetermined through e.g. machine learning methods based on pre-known input and output data. This way, acceptance and confirmation thresholds may be regularly refined with new training "sessions" along the life of the method (and corresponding computer program).

In a further aspect, a computer program is provided comprising program instructions for causing a computer system to perform methods of detecting an artificial target within an image, such as e.g. the ones described before. The computer program may be embodied on a storage medium (for example, a CD-ROM, a DVD, a USB drive, on a computer memory or on a read-only memory) or carried on a carrier signal (for example, on an electrical or optical carrier signal).

In a still further aspect, a system is provided for detecting an artificial target within an image. The system comprises means for applying to a region of the image a primary classification algorithm for performing a feature extraction of the image region, the primary classification algorithm being based on a spectral profile defined by one or more spectral signatures with one or more features in at least part of the infrared spectrum.

The system still further comprises means for obtaining a relation between the one or more extracted features of the image region and the spectral profile, and means for verifying whether a first level of confidence (LoC) of the obtained relation between the one or more extracted features and the spectral profile is higher than a first predetermined confirmation level. The system yet further comprises means for determining (if the first LoC is higher than a first predetermined confirmation level) that the image region corresponds to the artificial target to be detected, thereby obtaining a confirmed artificial target.

Alternatively, another system is provided for detecting an artificial target within an image. This other system is configured to apply to a region of the image a primary classification algorithm for performing a feature extraction of the image region, the primary classification algorithm being based on a spectral profile defined by one or more spectral signatures with one or more features in at least part of the infrared spectrum.

The other system is still further configured to obtain a relation between the one or more extracted features of the image region and the spectral profile, and to verify whether a first level of confidence (LoC) of the obtained relation between the one or more extracted features and the spectral profile is higher than a first predetermined confirmation level. The other system is yet further configured to determine (if the first LoC is higher than the first predetermined confirmation level) that the image region corresponds to an artificial target to be detected, thereby obtaining a confirmed artificial target.

In another aspect, a computer system is provided comprising a memory and a processor, embodying instructions stored in the memory and executable by the processor, the instructions comprising functionality to execute a method of detecting an artificial target within an image such as the ones described before.

In a further aspect, a method of detecting a target within an image is provided. The method comprises applying to the image a primary classification algorithm based on spectral features. The method further comprises, if a level of confidence of the result of applying the primary classification algorithm to the image is enough, determining that the result of applying to the image the primary classification algorithm corresponds to at least a target to be detected and/or a background to be detected, obtaining a confirmed target and/or a confirmed background.

The primary classification algorithm may be based on any known classification technique aimed at determining SSOIs in an image. Classification technique may comprise Artificial Intelligence or not. Artificial Intelligence may be implemented by using machine learning techniques (such as e.g. spectral-driven algorithms), which may be supervised, unsupervised or semi-supervised. Primary classification algorithm may be based on e.g. deep machine learning. However, as commented in other parts of the disclosure, the primary classification may not comprise machine learning and, therefore, may be based on e.g. spectral matching or similar known approaches.

A SSOI may be defined herein as a group of pixels (of the image) representing outliers or salient spectral conditions with respect to surrounding background pixels. A SSOI may further comprise at least a part of said background pixels and/or significant spectral features expressed through tags which may represent descriptors associated to the pixels comprised in the SSOI.

The level of confidence (LoC) may be defined herein as the result of a measurement of the accuracy of the classification (performed by the primary classification algorithm) and/or the sensitivity of the model used in said classification. The level of confidence may be determined by the classification itself or by a further algorithm/method aimed at that purpose. Confidence may be determined according to any known mapping approach based on e.g. statistical techniques. This mapping may comprise comparing (data in) the SSOI with predefined patterns and determining a correspondence (or correlation or similarity) between the SSOI and patterns. A predefined pattern (or model) may represent spectral conditions of reference defining a target to be detected.

These predefined patterns or models may comprise predefined SSOIs representing spectral features of reference corresponding to e.g. particular coatings or materials (e.g. paintings) causing uniquely identifiable spectral conditions. The predefined SSOIs may be included in a spectral library or database that may consulted by the primary classification or further algorithm/method aimed at determining the level of confidence. These uniquely identifiable paintings may have been used to paint corresponding entity (e.g. vehicle, ship, aircraft, etc.) or group of entities (e.g. vehicle model, ship or aircraft fleet, etc.). Said entity or group of entities may be identified when required by performing target identification methods according to the present disclosure.

Determining whether the level of confidence of a potential target/background is enough may comprise verifying whether the confidence exceeds a predefined confidence threshold. If no SSOIs have been produced by the primary classification, the image of parts of the image may be further processed as explained in other parts of the present disclosure. If a SSOI has been determined with enough confidence, said SSOI may be directly assumed as detected or confirmed target (and/or background if it is the case) within the image and no further processing may be performed. If a SSOI has been determined without enough confidence, said SSOI may be further processed as explained in other parts of the present disclosure.

The level of confidence (LoC) may be predefined depending on the application. For example, the emergency rescue search may have a predefined LoC of 99.0% or similar. In other examples, LoC may be defined as part of the overall computational process to balance the capacities between the primary classification and a further (or secondary) classification aimed at refining the results of the primary classification. This way, the amount of data processed by the primary and secondary classifications may be optimally distributed between them to obtain the maximum LoC in both classifications as a whole. A particular module/sub-method may be dedicated to balance the LoCs and the usage of the primary and secondary classifications. Furthermore, the balance may be performed based on the computational capacity available. This module/sub-method may determine an overall LoC associated with the whole method/process. This overall LoC may be used to decide iterating some of the primary and secondary classifications, both classifications, or part of the classifications. Not only LoCs may be determined in relation to the overall method and/or to primary/secondary classification, but different LoCs may be determined in relation to particular potential targets, backgrounds, etc. Any of said LoCs may be re-adjusted during the execution of the method.

With the suggested approach, the application to the image of the primary classification algorithm based on spectral features/data may allow obtaining a good/optimal balance between data results accuracy and computational efficiency.

In the case that not enough confidence has been attributed to (at least part of) the result of the primary classification algorithm, a secondary classification algorithm (based on spectral or non-spectral features) may be performed or applied. If no SSOIs have been produced, the secondary classification may be applied to the whole image. Otherwise, if insufficient confidence has been attributed to some SSOIs from the primary classification, the secondary classification may be applied to SSOIs with not enough confidence produced by the primary classification.

The secondary classification algorithm may be based on any known classification technique, in same or similar way as commented with respect to primary classification. The secondary classification may confirm or discard "pre-determined" SSOIs (with not enough confidence) from the primary classification as candidates to be target or potential targets (and/or corresponding background if it is the case). If no SSOIs have been produced by the primary classification, the whole image may be inspected by the secondary classification to detect new SSOIs.

The secondary classification may comprise determining a level of confidence of new SSOIs or pre-determined SSOIs classified as candidates to be target/background (or potential targets/backgrounds). Alternatively, the determination of confidence of candidates (or potential targets/backgrounds) may be performed once the secondary classification has been completed in order to determine whether enough LoC may be attributed to potential targets/backgrounds.

The confidence of the secondary classification may be determined and assumed as sufficient or insufficient in same or similar manner as described with respect to the primary classification. Any new SSOI or pre-determined SSOI classified as candidate to be target/background (or as potential target/background) may be finally assumed as detected or confirmed target if said candidate has been determined with enough confidence. Different roles may be attributed to the primary and secondary classifications. In some examples, the primary classification may be used as a pre-classifier and the secondary as a "deep" classifier. In other examples, the primary classification may be used as an identification module and the secondary as a recognition module. In further examples, the primary classification may be used as a compression method aimed at reducing the amounts of data to be sent to the secondary classification performed at a remote site with respect to the primary classification. In still further examples, the primary classification may provide results related to a class hierarchy (e.g. car manufacturer) and the secondary classification may provide results related to a subclass hierarchy (i.e. car model).

The primary classification may have a computational cost significantly lower than the secondary classification. In some examples, the primary classification may not use Artificial Intelligence/machine learning (e.g. primary classification may include spectral mapping without machine learning) and the secondary classification may be a classification using Artificial Intelligence/machine learning. In other examples, the primary classification may be a classification with non-deep machine learning and the secondary classification may be a classification based on Neural Networks and deep machine learning. And so on.

According to this approach, the primary classification may be seen as a pre-classifier applied to the whole image, i.e. all the pixels of the image and tags, descriptors, metadata . . . associated to the pixels. Since processing the whole image may increase the computational cost of the process, said increase of the cost may be compensated (or attenuated) by performing a less computationally demanding (i.e. less accurate) classification as primary classification. Additionally or alternatively, less features (which may be e.g. only spectral features) to be extracted by the primary classification may be considered to reduce the computational cost of said classification. Also the size of the training samples in supervised machine learning may be restricted in the case that said samples refer to e.g. specific coating/material. Mainly in the case that said coatings/materials are designed to cause uniquely identifiable spectral conditions.

Then, only those parts of the image (SSOIs or potential targets/backgrounds) identified/produced by the primary (pre-) classification with not enough LoC may be processed by a (more computationally demanding) secondary classification with higher accuracy. This way, the lower accuracy of the primary classification may be compensated by the higher accuracy of the secondary classification applied to lower amounts of data in comparison with the primary classification.

Various experiments have revealed that this solution based on performing a less computationally demanding (pre-) classification on the whole image, and a more computationally demanding classification on parts of the image may provide an improved balance between accuracy in the results and efficiency in the use of computational resources, in comparison with prior art methods aimed at same or similar purpose (identifying a target within an image).

In some examples, the target identification method may be configured to be performed at the same system/site, which may be the system/site dedicated to acquire the image(s) to be processed by the method, or may be a different system/site.

In alternative configurations, the target identification method may be configured to be performed in a distributed manner. For example, at least the primary classification may be performed at a first system/site and at least the secondary classification may be performed at a second system/site different from the first system/site. The first system/site may be the system/site dedicated to acquire the image(s) to be processed by the method or may be a different system/site.

In a further aspect, a computer program is provided comprising program instructions for causing a computer system to perform a method of detecting a target within an image, such as e.g. the one described before. The computer program may be embodied on a storage medium (for example, a CD-ROM, a DVD, a USB drive, on a computer memory or on a read-only memory) or carried on a carrier signal (for example, on an electrical or optical carrier signal).

In a still further aspect, a system is provided for identifying a target within an image. This system comprises means for applying to the image a primary classification algorithm based on spectral features. The system further comprises means for determining that the result of applying to the image the primary classification algorithm corresponds to a target to be detected and/or to a background to be detected, obtaining a confirmed target and/or a confirmed background.

Alternatively, a system is provided for detecting a target within an image. This system is configured to apply to the image a primary classification algorithm based on spectral features. The system is further configured to determine whether a level of confidence of the result of applying the primary classification algorithm to the image is enough and, if the level of confidence is enough, to determine that the result of applying to the image the primary classification algorithm corresponds to a target to be detected and/or to a background to be detected, obtaining a confirmed target and/or a confirmed background.

In a yet further aspect, a system is provided for detecting a target within an image. This system is configured to, after applying to the image a primary classification algorithm based on spectral features, if the level of confidence of the result of applying to the image the primary classification algorithm is not enough:

if the result of applying to the image the primary classification algorithm based on spectral features does not comprise at least one detected signature of interest, applying to the image a secondary classification algorithm based on spectral and/or non-spectral features taking into account the result of applying to the image the primary classification algorithm, the secondary classification algorithm being configured to detect a target within the image; or if the result of applying to the image the primary classification algorithm based on spectral features comprises at least one detected signature of interest, applying to the result of applying to the image the primary classification algorithm a secondary classification algorithm based on spectral and/or non-spectral features, the secondary classification algorithm being configured to detect a target within the image;

in both cases, if the level of confidence of the result of applying the secondary classification algorithm is enough:

determining that the result of applying the secondary classification algorithm corresponds to a target to be detected or to a background to be detected, obtaining a confirmed target and/or a confirmed background.

In another aspect, a computer system is provided comprising a memory and a processor, embodying instructions stored in the memory and executable by the processor, the instructions comprising functionality to execute a method of detecting a target within an image such as the one described before.

BRIEF DESCRIPTION OF THE DRAWINGS

Non-limiting examples of the present disclosure will be described in the following, with reference to the appended drawings, in which:

FIG. 1 is a schematic representation of a particular architecture including an artificial target detection or a target detection system according to examples;

FIG. 2a is a block diagram schematically illustrating an artificial target detection system according to examples, such as the ones described with respect to FIG. 1;

FIG. 3a is a flowchart schematically illustrating an artificial target detection method according to examples;

FIG. 3b is a flowchart schematically illustrating a target identification method according to examples.

DETAILED DESCRIPTION OF EXAMPLES

Figure 2B:
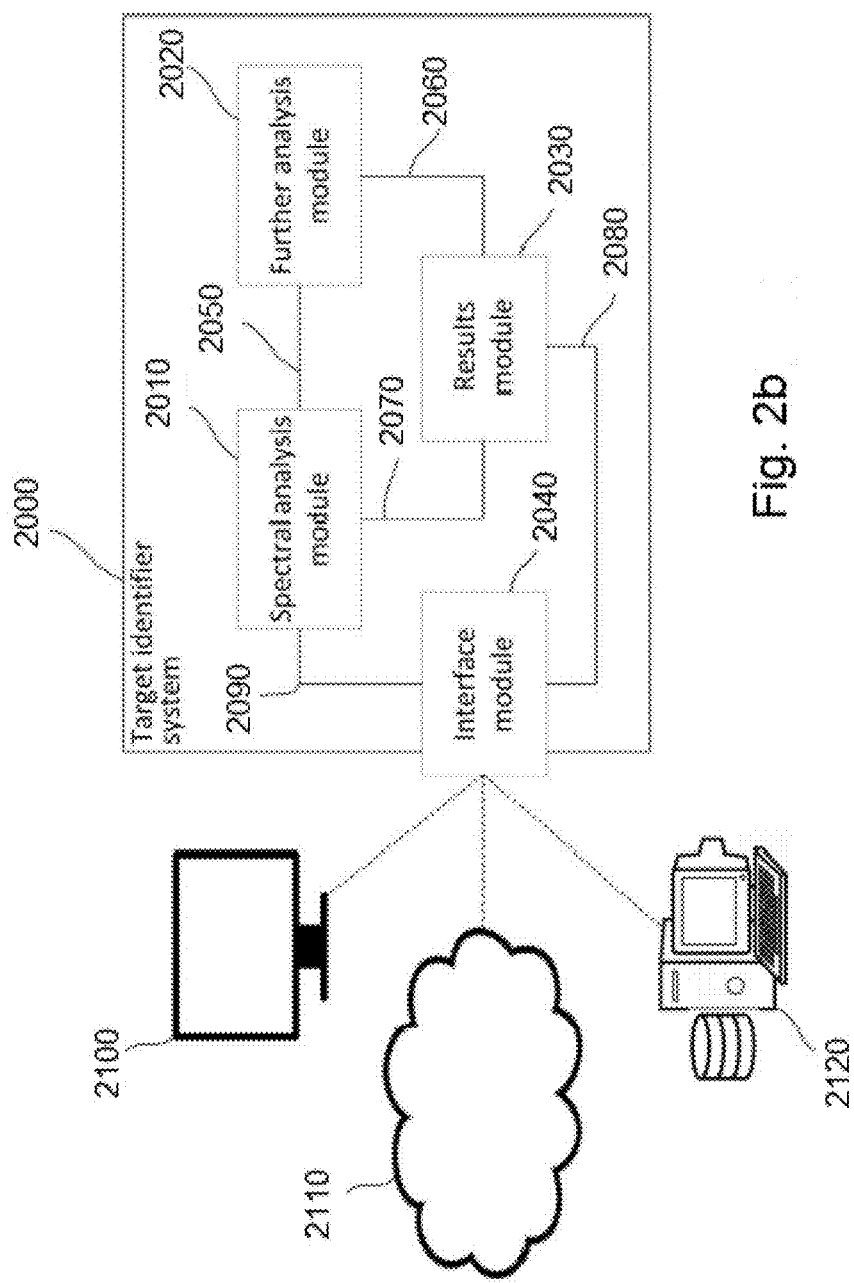
FIG. 2b is a block diagram schematically illustrating a target identification system according to examples, such as the ones described with respect to FIG. 1.

FIG. 1 may be a schematic representation of a particular architecture including an artificial target detection system according to examples. The architecture may comprise an image acquisition system like a satellite 100, an airborne camera (e.g. a drone camera) or a ground camera system (e.g. a vehicle camera or a phone camera), a storage system 103, 104 and a ground station 105. The artificial target detection system may totally or partially reside at any one of the acquisition system (satellite) 100, storage system 103, 104 or ground station 105.

Additionally, FIG. 1 may be a schematic representation of a particular architecture including a target identification system according to some examples. In this example, the architecture may comprise the satellite 100, the storage system 103, 104 and the ground station 105. The target identification system may totally or partially reside at any one of the satellite 100, storage system 103, 104 and ground station 105.

In some examples, the artificial target detection system or the target identification system may be comprised in the ground station 105 and the satellite 100 may acquire images and send them directly to the ground station 105 for artificial target identification or for target identification. In other examples, storage system 103, 104 may intermediate between satellite 100 and ground station 105 by storing images from the satellite 100 and providing them to the ground station 105. In further alternative examples, the artificial target detection system may be a distributed system with e.g. a first part in the satellite 100 and a second part in the ground station 105. Images may be acquired (from e.g. satellite 100) according to the target to be detected. The target to be detected may include an anomaly such as a spectral anomaly, which may permit its identification in the manners described in other parts of the disclosure. In other examples, storage system 103, 104 may intermediate between satellite 100 and ground station 105 by storing images from the satellite 100 and providing them to the ground station 105. In further alternative examples, the target identification system may be a distributed system with e.g. a first part in the satellite 100 and a second part in the ground station 105.

The satellite 100 may be configured to obtain images 101 with a suitable image capturing device. In examples, the acquisition system may be a ground camera, a vehicle sensor, augmented reality devices and mobile cameras with active or passive acquisition methods. These images 101 may include abnormalities 102 that may correspond to the target to be detected or not. Image abnormalities (or anomalies) may be defined herein as a cluster of pixels in the image representing outliers or salient spectral features with respect to neighbour pixels surrounding said cluster of pixels. That is, an abnormality may be e.g. a cluster of pixels representing a first spectral condition surrounded by neighbour pixels corresponding to a second spectral condition different from the first spectral condition.

The storage system 103 may comprise a memory 104 (e.g. a hard-disk or similar) to store images received from the satellite 100. The images 101 may be obtained from other types of airborne ship such as e.g. a drone, plane, helicopter, aircraft, etc. equipped with a suitable camera. Camera may be configured to obtain e.g. spectral images including multi-spectral images, hyper-spectral images, ultra-spectral images, etc. Imaging devices configured to obtain other types of spectral images may also be used, such as e.g. radar images, Synthetic aperture radar (SAR) images, Lidar images, Raman images, etc. Traffic and security cameras, mobile cameras, car cameras and so on may also be used depending on circumstances. Augmented reality devices (e.g. augmented-reality glasses), google glasses, smartphones or similar devices may also be employed to obtain images to be analysed by the artificial target detection system. Cameras, imaging devices or image capturing devices may be based on known technologies, such as e.g. optical, radar, Lidar, SAR, Radio Frequency (RF) technologies or any possible combination of them. In examples, google glasses, smartphones or similar devices may also be employed for obtaining images to be analysed.

FIG. 2a is a block diagram schematically illustrating an artificial target detection system according to examples, such as the ones described with respect to FIG. 1. The artificial target detection system 200 may comprise a spectral analysis module 201, a further analysis module 202, a management module 203 and an interface module 204.

Interface module 204 may permit connecting the artificial target detection system 200 with other devices/systems, such as e.g. display/screen 210, communications network 211, another (computer) system 212, an image acquisition device (sensor, camera) 213, etc. Said connection may be wired or wireless.

In case of a wired connection, the Interface module 204 may comprise a wired communication sub-module based on, for example, a serial port, such as USB, micro USB, mini USB, Fire-wire or Ethernet.

In case of a wireless connection, in some examples, the Interface module 204 may comprise a short-range communication sub-module based on, for example, Bluetooth (e.g. BLE—Bluetooth 4.0 Low Energy), NFC, Zig bee or Wi-Fi technology.

Alternatively or complementarily, the Interface module 204 may comprise a long-range communication sub-module based on, for example, GSM, GPRS, 3G, 4G or satellite technology.

Furthermore, the Interface module 204 may comprise a communication sub-module based on optical fiber, ADSL, etc.

Data related to artificial target identification may thus be displayed on display 210, or transmitted to remote site(s) through Internet 211 or to further computer systems 212, which are connected with the artificial target detection system 200 through the Interface module 204. System at remote site accessible through Internet 211 and/or another computer system 212 may further process the received artificial target identification data or simply display it on corresponding display device.

Spectral analysis module 201 may be configured to apply a primary classification algorithm to a selected region of a received image to spectrally analyse the image region. Said image may have been received from another system 212, an image acquisition device (sensor, camera) 213, a remote site at Internet 211, etc. through the Interface module 204. The image region may have been selected according to selection criteria either by the spectral analysis module 201 or by a selection module (not shown) dedicated at that purpose. Spectral analysis module 201 or selection module may receive the image to be analysed through corresponding connection 209 with Interface module 204. Details about spectral analysis are provided in other parts of the disclosure with reference to other figures.

Further analysis module 202 may be configured to apply a secondary classification algorithm (based on spectral and/or non-spectral features) to those image regions that have not been definitely classified (as either confirmed artificial target or background) by the Spectral analysis module 201. In other words, the further analysis module 202 may be configured to perform a further analysis of image regions from the Spectral analysis module 201. The image region may have been enriched by the Spectral analysis module 201 with additional data. Further analysis module 202 may receive the image region from the Spectral analysis module 201 through suitable connection 205 between said modules 201, 202. Details about the further analysis are provided in other parts of the disclosure with reference to other figures.

Management module 203 may receive analysis data from Spectral and Further analysis modules 201, 202 through suitable connections 206, 207 and, optionally, distribute computational load and/or change and/or update corresponding LoCs. Management data obtained taking into account the received analysis data may be sent to Interface module 204 through corresponding connection 208 between Management and Interface modules 203, 204. Details about management data are provided in other parts of the description with reference to other figures.

As commented with respect to FIG. 1, the artificial target detection system 200 may be a distributed system or not. In the first situation, a first part of the system 200 may reside at first site/device/station and a second part of the system 200 may reside at second site/device/station. In some examples according to FIG. 1, the satellite 100 (or any other remote sensing acquisition system such as a ground camera or any airborne device equipped with suitable imaging device, etc.) may include the whole system 200, i.e. all modules 201-204 and connections 205-209. In other examples, the whole system 200 may reside at (remote) ground station 105. In further examples, at least the Spectral analysis module 201 may reside at satellite (or another suitable vehicle) 100 and at least the Further analysis module 202 may be located at ground station 105. Other configurations according to other distributions of the modules 201-204 are possible according to same or similar principles.

Real time image processing may be performed locally with the artificial target detection system 200 residing at the site/device/station dedicated to acquire images, such as e.g. at the satellite/vehicle 100 of FIG. 1. In this case, once obtained, images may be immediately processed (i.e. in real time), since the camera (or sensor) and the artificial target detection system 200 are local to each other. Alternatively, near real time processing may be performed with the artificial target detection system 200 at a remote ground site/device/station, such as e.g. at ground station 105 (or remote server) of FIG. 1.

In examples wherein image acquisition devices 213 like ground cameras, vehicle cameras and/or augmented reality devices such as e.g. Google glasses, smartphones or similar devices are used to capture images, a suitable artificial target detection system 200 may be included in said device. This way, real time image processing may also be performed at said device because camera and artificial target detection system 200 are local to each other and due to optimized computational efficiency of the method (performed by the system 200) according to present disclosure. Alternatively, near real time processing may be performed with the artificial target detection system 200 at a server or cloud system remotely arranged with respect to the Google glasses, smartphone or similar device.

In general, any combinations of local/remote and/or real/non-real time processing of the primary and secondary classifications are possible. Some examples may include local and real time performance of the primary classification, and remote and non-real time performance of the secondary classification with respect to primary classification. Other examples may include local and real time performance of both primary and secondary classifications in corresponding device (e.g. Google glasses, smartphone, airborne system, etc.). Further examples may include remote and non-real time performance of both primary and secondary classifications with respect to acquisition of the image(s). And so on.

Modules 201-204 (and connections 205-209) constituting the artificial target identifier system 200 may be implemented by computing means, electronic means or a combination thereof. The computing means may be a set of instructions (that is, a computer program) and then corresponding module(s) 201-204 may comprise a memory (or storage media) and a processor, embodying said set of instructions stored in the memory and executable by the processor. The instructions may comprise functionality to execute artificial target detection methods such as e.g. the ones described in other parts of the disclosure with reference to other figures.

In the case that any of the modules 201-204 is implemented only by electronic means, the controller may be, for example, a microcontroller, a CPLD (Complex Programmable Logic Device), an FPGA (Field Programmable Gate Array) or an ASIC (Application-Specific Integrated Circuit).

In the case that any of the modules 201-204 is a combination of electronic and computing means, the computing means may be a set of instructions (e.g. a computer program) and the electronic means may be any electronic circuit capable of implementing the corresponding step or steps of corresponding artificial target detection method(s).

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of (artificial target identification) methods according to the present disclosure. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant (artificial target identification) methods.

In configurations of example, a common memory and processor may be shared by all modules 201-204. The memory may store a computer program implementing all necessary functionalities to cause performance of corresponding artificial target detection method. The processor may be responsible for executing said computer program stored in the memory. Modules 201-204 may be e.g. routines, functions or procedures constituting the whole (artificial target identification) computer program.

Execution of said program may thus be seen as modules 201-204 cooperating to jointly perform corresponding artificial target detection method.

FIG. 2b is a block diagram schematically illustrating a target identification system according to examples, such as the ones described with respect to FIG. 1. The target identification system 2000 may comprise a spectral analysis module 2010, a further analysis module 2020, a results module 2030 and an interface module 2040.

Interface module 2040 may permit connecting the target identification system 2000 with other devices/systems, such as e.g. display/screen 2100, communications network 2110, another (computer) system 2120, etc. Said connection may be wired or wireless.

In case of a wired connection, the Interface module 2040 may comprise a wired communication sub-module based on, for example, a serial port, such as USB, micro USB, mini USB, Fire-wire or Ethernet.

In case of a wireless connection, in some examples, the Interface module 2040 may comprise a short-range communication sub-module based on, for example, Bluetooth (e.g. BLE—Bluetooth 4.0 Low Energy), NFC, Zigbee or Wi-Fi technology.

Alternatively or complementarily, the Interface module 2040 may comprise a long-range communication sub-module based on, for example, GSM, GPRS, 3G, 4G or satellite technology.

Furthermore, the Interface module 2040 may comprise a communication sub-module based on optical fiber, ADSL, etc.

This way, data related to target identification may be displayed on display 2100, or transmitted to remote site(s) through Internet 2110 or to further computer systems 2120, which are connected with the target identification system 2000 through the Interface module 2040. System at remote site accessible through Internet 2110 and/or another computer system 2120 may further process the received target identification data or simply display it on corresponding display device.

Spectral analysis module 2010 may be configured to apply a primary classification algorithm to an image or, in other words, to perform a spectral analysis of the image. Said image may have been received from another system 2120, a remote site at Internet 2110, etc. through the Interface module 2040. Spectral analysis module 2010 may receive the image to be analysed through corresponding connection 2090 with Interface module 2040. Details about the spectral analysis are provided in other parts of the disclosure with reference to other figures.

Further analysis module 2020 may be configured to apply a secondary classification algorithm (based on spectral or non-spectral features) to all or parts of the image from the Spectral analysis module 2010. In other words, the further analysis module 2020 may be configured to perform a further analysis of all or parts of the image from the Spectral analysis module 2010. Said all or parts of the image may have been enriched by the Spectral analysis module 2010. Further analysis module 2020 may receive the all or parts of the image from the Spectral analysis module 2010 through suitable connection 2050 between said modules 2010, 2020. Details about the further analysis are provided in other parts of the disclosure with reference to other figures.

Results module 2030 may receive analysis data from Spectral and Further analysis modules 2010, 2020 through suitable connections 2060, 2070, and produce results data about one or more identified targets depending on said analysis data. Once produced, said results data may be sent to Interface module 2040 through corresponding connection 2080 between Results and Interface modules 2030, 2040. Details about how results data may be produced are provided in other parts of the description with reference to other figures.

As commented with respect to FIG. 1, the target identification system 2000 may be a distributed system or not. In the first situation, a first part of the system 2000 may reside at first site/device/station and a second part of the system 2000 may reside at second site/device/station. In some examples according to FIG. 1, the satellite 100 (or any airborne ship equipped with suitable imaging device) may include the whole system 2000, i.e. all modules 2010-2040 and connections 2050-2090. In other examples, the whole system 2000 may reside at (remote) ground station 105. In further examples, at least the Spectral analysis module 2010 may reside at satellite (or another suitable vehicle) 100 and at least the Further analysis module 2020 may be located at ground station 105. Other configurations according to other distributions of the modules 2010-2040 are possible according to same or similar principles.

Real time image processing may be performed with the target identification system 2000 residing at the site/device/station dedicated to acquire images, such as e.g. at the satellite/vehicle 100 of FIG. 1. In this case, once obtained, images may be immediately processed (i.e. in real time), since the camera (or sensor) and the target identification system 2000 are local to each other. Alternatively, near real time processing may be performed with the target identification system 2000 at a remote ground site/device/station, such as e.g. at ground station 105 of FIG. 1.

In examples wherein augmented reality devices such as Google glasses, smartphones or similar devices are used to capture images, a suitable target identification system 2000 may be included in said device. This way, real time image processing may also be performed at said device because camera and target identification system 2000 are local to each other and due to the optimized computational efficiency of the method (performed by the system 2000) according to present disclosure. Alternatively, near real time processing may be performed with the target identification system 2000 at a server or cloud system remotely arranged with respect to the Google glasses, smartphone or similar device.

In general, any combinations of local/remote and/or real/non-real time processing of the primary classification and secondary classification are possible. Some examples may include local and real time performance of the primary classification, and remote and non-real time performance of the secondary classification with respect to primary classification. Other examples may include local and real time performance of both primary and secondary classifications in corresponding device (e.g. Google glasses, smartphone, airborne system, etc.). Further examples may include remote and non-real time performance of both primary and secondary classifications with respect to acquisition of the image (s). And so on.

The primary (pre-) classification may be seen as a (spectral driven) compression method, since the amounts of data to be processed by the secondary classification may be significantly reduced as a result of performing the primary classification. This may be very advantageous in implementations in which the data outputted by the primary classification is sent or transmitted to a remote site wherein the secondary classification is performed. Since the data outputted by the primary classification may be highly reduced in comparison with the entire image, this transmission of data may result significantly optimized.

Modules 2010-2040 (and connections 2050-2090) constituting the target identified system 2000 may be implemented by computing means, electronic means or a combination thereof. The computing means may be a set of instructions (that is, a computer program) and then corresponding module(s) 2010-2040 may comprise a memory (or storage media) and a processor, embodying said set of instructions stored in the memory and executable by the processor. The instructions may comprise functionality to execute target identification methods such as e.g. the ones described in other parts of the disclosure with reference to other figures.

In the case that any of the modules 2010-2040 is implemented only by electronic means, the controller may be, for example, a microcontroller, a CPLD (Complex Programmable Logic Device), an FPGA (Field Programmable Gate Array) or an ASIC (Application-Specific Integrated Circuit).

In the case that any of the modules 2010-2040 is a combination of electronic and computing means, the computing means may be a set of instructions (e.g. a computer program) and the electronic means may be any electronic circuit capable of implementing the corresponding step or steps of corresponding target identification method(s).

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of (target identification) methods according to the present disclosure. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant (target identification) methods.

In configurations of example, a common memory and processor may be shared by all modules 2010-2040. The memory may store a computer program implementing all necessary functionalities to cause performance of corresponding target identification method. The processor may be responsible for executing said computer program stored in the memory. Modules 2010-2040 may be e.g. routines, functions or procedures constituting the whole (target identification) computer program. Execution of said program may thus be seen as modules 2010-2040 cooperating to generally perform the target identification method.

FIG. 3a is a flowchart schematically illustrating an artificial target detection method according to examples. This method may be performed by a system similar to the ones shown in FIG. 2a. Number references from FIG. 2a may be used in following description of FIG. 3a for the sake of better understanding.

At block 300, the artificial target detection method may be started as a result of e.g. detecting a starting condition. Said condition may comprise e.g. reception of an image to be analysed for identifying artificial target(s), reception of a request petitioning the start of the method, etc. Block 300 may be executed by e.g. the interface module 204 of FIG. 2a.

At block 301, the image (to be analysed) may be received and transferred to next block 302 if e.g. real time processing of the image is required. Otherwise, the image may be temporarily stored in an input queue until a batch or background sub-method comprising the remaining blocks 302-306 is triggered. Block 301 may be performed by e.g. the interface module 204 of FIG. 2a. Block 301 may also perform a selection of a region of the image according to selection criteria such as the ones described in other parts of the disclosure. Alternatively, this selection may be performed at a selection block (not shown) different from block 301.

At block 302, the image region may be spectrally analysed (by a primary classification algorithm) to extract features possibly corresponding to an artificial target to be identified. The primary classification may perform said extraction of features depending on a spectral profile defined by one or more spectral signatures with one or more features in at least part of the infrared spectrum. The spectral analysis may be performed at block 302 by using known classification techniques, such as e.g. spectral-driven algorithms. The primary classification may also perform spatial analysis according to principles described in other parts of the disclosure.

Descriptors/tags representing significant spectral (and/or spatial) features extracted from the image region may be used in (remote or local) sensing for data exploration and class separation/distinction. Spectral features may be expressed as parameters indicating reflectance, radiance, roughness, luminance, specific reemitted energy, temperature, emissivity, di electricity, polarization, phase data, a combination of at least two of said properties, etc. Spectral features may include textural features and, in some examples, may take into account neighbourhood relations between pixels (spatial features). Significant spectral features may be detected using anomaly (or abnormality) detection, scarcity, histograms etc. and/or using spectral libraries containing patterns or models of reference. Groups or clusters of salient/outlier pixels may be compared with said patterns for determining if said salient pixels correspond to or denote spectral features to be considered.

Features (in the form of e.g. spectral values, etc.) extracted from the image region may be compared (at block 302) to the spectral profile to determine a relation (e.g. deviation, correspondence, correlation, etc.) between extracted features and spectral profile. If said relation results with first LoC higher than a first predetermined confirmation level, the image region may be confirmed as being or including the artificial target. For instance, if first LoC between values of the image region and spectral profile is determined to have a correlation level (first LoC) greater than or equal to e.g. 99% (first predetermined confirmation level), salient pixels associated with such tags in the image region may be assumed as corresponding to confirmed artificial target.

If the relation results with first LoC higher than a first predetermined minimum acceptance level (e.g. 50%) but lower than the first predetermined confirmation level (e.g. 99%), a secondary classification algorithm based on spectral and/or non-spectral features may be applied to the image region.

In the case of correlation level (first LoC) lower than the first predetermined minimum acceptance level (e.g. 50%), affected pixels may be subjected to further processing (e.g. further spectral, geometrical, textural analysis at next block 304) for confirming or discarding them as background. This discarding approach permits primary classification (block 302) to act as a compression tool, in the sense that data to be further processed by secondary classification (block 304) is reduced.

Other confidence thresholds (different from 50%, 99%) as well as different LoC metrics may be considered depending on the application. For example, higher confirmation (or confidence) levels may be required in search and rescue applications in comparison with less critical artificial target detection applications.

As commented in other parts of the description, determination of the first LoC and its evaluation may be performed at block 303 in alternative implementations.

Spectral analysis (performed by primary classification algorithm) may further comprise, at block 302, enriching the generated spectral features by attributing metadata generated during the spectral analysis of the image region. Examples of said metadata are any metadata associated with the image region (from which features have been extracted), tag descriptors, etc. More details about metadata, its assignment to the image region and its use are provided in other parts of the description.

Block 302 may be performed by e.g. the spectral analysis module 201 of FIG. 2a. Once block 302 has been completed, a transition to next block 303 may be undertaken.

First LoC may be determined at block 303 as being sufficient, insufficient or very insufficient according to any of the following criteria. If first LoC is greater than first predetermined confirmation level (e.g. 99%) first LoC may be assumed as being sufficient. If first LoC is lower than first predetermined confirmation level (e.g. 99%) and higher than first predetermined minimum acceptance level (e.g. 50%), first LoC may be assumed as being "simply" insufficient. If first LoC is lower than first predetermined minimum acceptance level (e.g. 50%) first LoC may be assumed as being very insufficient.

Transition to one or another block may be performed from block 303 according to any of the following criteria shown in FIG. 3a. If first LoC is determined as being sufficient, image region may be confirmed as being or including artificial target, in which case transition to end block 306 may be performed. If first LoC is determined as being very insufficient, image region may be confirmed as background, in which case transition to end block 306 may be performed. If first LoC is determined as being insufficient, image region may be assumed as being candidate requiring further processing, in which case transition to block 304 may be performed to apply secondary classification to the "candidate" image region.

Other transition(s) are also possible from block 303 that are not shown in FIG. 3a. If first LoC is determined as being insufficient, image region may be assumed as being candidate requiring further processing, and transition to block 302 may be performed to repeat application of primary classification to "candidate" image region with a configuration not applied in previous executions of block 302. Primary classification may be repeated based on e.g. parameter(s) or combination of parameters unconsidered in preceding executions. For instance, one execution may focus on reflectance as spectral parameter, next execution may focus on radiance, further next execution may focus on roughness, yet further next execution may focus on luminance, and so on.

Block 303 may be performed by e.g. the Management module 203 (of FIG. 2a) once spectral features have been determined (or not) at previous block 302.

Secondary classification may be performed (at block 304) based on Artificial Intelligence implemented with e.g. machine learning algorithms which may be supervised, unsupervised or semi-supervised. Machine learning algorithms may use predefined spectral or non-spectral training data which may comprise e.g. spectral data, texture data, geometric data, etc. Neural networks are examples of machine learning algorithms that may be used with acceptable results. Foundations about machine learning and training data similar to those provided in other parts of the description may also be considered in the case of block 304. As commented in other parts of the disclosure, block 302 may include less computationally demanding methods (e.g. non machine learning algorithms or non-deep machine learning algorithms), and block 304 may include more computationally demanding methods (e.g. deep machine learning algorithms).

In some examples, the primary classification (block 302) may process a lighter version (e.g. SAR version) of the image region and, if said region is not confirmed as artificial target at blocks 302-303, the secondary classification may process at block 304 a heavier version (e.g. multispectral version) of the same image region. In this particular example, the primary classification may classify the SAR image region depending on radar features and the secondary classification may classify the multispectral image region depending on optical features.

In primary and/or secondary classifications, metadata may be used to enrich the processing of the image region. Metadata may be assigned to the whole image and/or to the image region. Metadata assigned to the image may be inherited by the image region once extracted from the image. Metadata may be received from sources other than the image itself. Metadata may not be used when corresponding (first or second) LoC denotes highly insufficient confidence and the image region results confirmed as background of the image. When corresponding (first or second) LoC denotes sufficient confidence but not enough to be confirmed as artificial target, metadata may be used to refine the classification of the image region.

Metadata may comprise e.g. data of the image region, time of acquisition data, geo-positioning data, point of Interest (POI), POI for monitoring, Region of interest (ROI), ROI for monitoring, tags, tag descriptors data (e.g. coating information, spectral properties of coatings, coating manufacturers, names and date of application), spectral signature or spectral feature, spectral signature or spectral feature descriptors data, spectral profile, monitoring data, etc. Metadata may also comprise data from external sources like databases (e.g. material manufacturers, models etc.), Internet, Internet of Things, social networks, etc. Received metadata may be related to any one of tag(s), the image, the image region, the spectral profile, spectral signature, etc.

Metadata may be used in the primary and/or secondary classification for restricting the search of features to specific conditions represented by said metadata. Examples of such restrictive conditions may refer to e.g. particular regions of interest in the image region, acquisition time of the image, etc. This approach may permit optimizing the computational resources used to perform the classification(s), since the search of features may be constrained to precise preconditions (e.g. spatial, temporal . . . conditions). Metadata may be received along with the image(s) to be analysed as part of the image(s) or as extra data linked someway to the image(s). Metadata may be linked to the whole image or to particular portions of the image. The image region that is being processed may thus be analysed in an enriched manner by considering metadata linked to the whole image or corresponding part(s) of the image.

Metadata of interest may also result from the execution of any of the primary/secondary classifications. For example, any of the primary and secondary classifications may classify an artificial target as confirmed in a certain location which may be of interest to be monitored. This way, a confirmed artificial target and its metadata (e.g. its position or Region of Interest ROI) may be classified as a point of interest to be monitored. In later executions of the primary/secondary classification(s) or the overall method itself, this point of interest (or ROI or spectral signature) may be monitored to detect changes produced at said point/region over time. Alarms/warnings may be generated to alert about said changes. In the same or similar way, a spectral feature (extracted from the image region) that has been identified and classified as confirmed artificial target, may be used as input of e.g. a spectral search engine dedicated to search (in the image region) spectral features similar to the inputted spectral feature. This search may be performed depending on constraints (e.g. ROI, LoC etc.) similar to those associated with the inputted spectral feature.

Mission data may also be used in any of the (primary and secondary) classifications. Mission data may refer to e.g. environmental conditions that may potentially influence the spectral (and non-spectral) conditions in the image region under analysis. Examples of mission data may include insolation, scattered background radiance, upwelling atmospheric radiance etc. which may be used to generate a modelled (spectral or non-spectral) feature as seen at the top of the atmosphere (TOA) by the sensor/camera. Top of Atmosphere (TOA) approach is a well-known concept in the field, so no detailed information about it is provided in the disclosure.

A library/database (or similar) including predefined spectral signatures or known tags (corresponding to coating or material causing identifiable spectral conditions) may be used for determining whether detected salient pixels (or extracted features) may correspond to spectral signatures of reference. A predefined spectral signature (e.g. in at least part of the infrared spectrum) may be a reflectance signature, which may be converted into a radiance signature if required. In the case that, for example, image(s) to be analysed are multispectral images with values expressed in radiance, such a conversion of the known tags from reflectance to radiance values may be undertaken. Said conversion may take into account ad hoc mission data.

In some examples, the secondary classification may be performed (at block 304) based on non-spectral features of e.g. a panchromatic or PAN (i.e. black/white) version of the image region. Said PAN version may have been acquired along with corresponding RGB (red, green, blue) multispectral version of the image (region). Such an approach may thus be based on spectrally analysing e.g. colour features of the multispectral version (at block 302) and, afterwards, analysing e.g. geometric features of the PAN (black/white) version (at block 304) to confirm or discard the image region as being or including artificial target. Colour features may refer to spectral features including the non-visible spectrum, i.e. infrared (IR) spectrum.

The overall artificial target detection method may thus comprise a shallow spectral analysis (primary classification) of a heavy image region (multispectral version) and a deeper analysis (secondary classification) of a much less heavy image region (PAN version). Said deeper analysis may be performed by the secondary classification considering non-spectral features such as e.g. geometric features (contours, shapes, etc.) on the PAN image region corresponding to the multispectral image region that has not been classified by the primary classification. This approach may thus permit optimizing the computational cost of the overall method.

Any of the primary and secondary classifications may additionally comprise enriching the image region by attributing to the image region metadata generated during the classification/analysis. Examples of said metadata are any metadata of the spectral signatures/features, tag descriptors, etc. Metadata may be assigned to the image region or the whole image if the (first/second) LoC of the (primary/secondary) classification is not very insufficient. Therefore, the processed image region (or the whole image) may be provided enriched by the (primary/secondary) classifier.

Block 304 may be performed by e.g. the further analysis module 202 of FIG. 2a. Once block 304 has been completed, the method may transition to next block 305. Depending on circumstances, a loop back from block 304 (or from block 305) to block 302 or a repetition of block 304 may also be performed.

Second LoC may be determined at block 305 as being sufficient, insufficient or very insufficient according to any of the following criteria. If second LoC is greater than second predetermined confirmation level (e.g. 99) second LoC may be assumed as being sufficient. If second LoC is lower than second predetermined confirmation level (e.g. 99%) and higher than second predetermined minimum acceptance level (e.g. 50%), second LoC may be assumed as being "simply" insufficient. If second LoC is lower than second predetermined minimum acceptance level (e.g. 50%) second LoC may be assumed as being very insufficient.

Transition to one or another block may be performed from block 305 according to any of the following criteria shown in FIG. 3a. If second LoC is determined as being sufficient, image region may be confirmed as being or including artificial target, in which case transition to end block 306 may be performed. If second LoC is determined as being very insufficient, image region may be confirmed as background, in which case transition to end block 306 may be performed. If second LoC is determined as being "simply" insufficient, image region may be assumed as being candidate requiring further processing, in which case transition to block 304 may be performed to repeat application of secondary classification to the "candidate" image region. Secondary classification may be repeated based on e.g. parameter value(s) or LoC value(s) or parameter(s) or combination of parameters unconsidered in preceding executions in same or similar manner as described before with respect to repetition of primary classification. However, in this case, non-spectral parameters may be considered. For instance, one execution may focus on shape (as non-spectral parameter) next execution may focus on size, and so on.

Other transition(s) are also possible to be performed from block 305 that are not shown in FIG. 3a. If second LoC is determined as being "simply" insufficient, image region may be assumed as being candidate requiring further processing and transition to block 302 may be performed to repeat application of primary classification to the "candidate" image region with a configuration unconsidered in previous executions of block 302. In this case, primary classification may be repeated based on e.g. parameter value(s) or LoC value(s) or parameter(s) or combination of parameters unconsidered in preceding executions in same or similar manner as described before.

Block 305 may be managed (or performed) by e.g. the Management module 203 (of FIG. 2a) once the image region has been processed by secondary classification.

At block 306, the artificial target detection method may be terminated by producing e.g. result data from classification results from block 302 (primary classification) and/or block 304 (secondary classification) with sufficient LoC and, in some examples, said result data may be sent to corresponding device/site/station for further processing thereof. Said further processing may include e.g. displaying result data on suitable display, other types of analysis such as e.g. multi-dimensional or datamining analysis, etc. Result data may be produced by Management module 203, and the sending of said data may be performed by interface module 204 (see FIG. 2a).

FIG. 3b is a flowchart schematically illustrating a target identification method according to first examples. This method may be performed by a system similar to the ones shown in FIG. 2b. Number references from FIG. 2b may be used in following description of FIG. 3b for the sake of better understanding.

At block 3000, the target identification method may be started as a result of detecting a starting condition. Said condition may comprise e.g. reception of one or more images to be analysed for identifying corresponding target(s), reception of a petition requesting start of the method, etc. Block 3000 may be executed by e.g. the interface module 2040 of FIG. 2b.

At block 3010, the one or more images may be received and transferred to next block 3020 if e.g. real time processing of the image(s) is required. Otherwise, the image(s) may be stored in an input queue until a batch or background sub-method comprising the remaining blocks 3020-3060 is triggered. Block 3010 may be performed by e.g. the interface module 2040 of FIG. 2b. The received one or more images may comprise values expressed in radiance, for example.

At block 3020, the received image(s) may be spectrally analysed (by a primary classification algorithm) to produce one or more spectral signatures of interest (SSOI) possibly corresponding to target(s) to be identified. The primary classification may also produce data indicating absence of SSOIs and/or integrity/non-integrity (or continuity/discontinuity) of spectral features in the SSOIs. The secondary classification may be performed (at next block 3040) depending on features other than spectral features (e.g. geometric features) in order to "by-pass" possibly detected spectral discontinuities. This way, if a SSOI from the primary classification cannot be confirmed as target due to e.g. excessive level of discontinuity, the same SSOI may be confirmed as target by the secondary classification based on e.g. geometric analysis. The spectral analysis may be performed (at block 3020) by using known classification techniques, such as e.g. spectral-driven algorithms.

Descriptors/tags representing significant spectral features in the SSOIs may be used in (remote or local) sensing for data exploration and class separability. SSOIs may be expressed as parameters indicating reflectance, radiance, roughness, etc. SSOIs may include textural features and, in some examples, may take into account neighbourhood relations between pixels. Significant spectral features may be detected using anomaly (or abnormality) detection, scarcity, histograms etc. and/or using spectral libraries containing patterns or models of reference. Groups or clusters of salient pixels may be compared with said patterns for determining if said salient pixels may correspond to a SSOI.

Metadata associated to the received image(s) may also be used to spectrally analyse the image(s). Metadata may comprise e.g. region of interest (ROI) data, time of acquisition data, tag descriptors (SSOIs) data, geo-positioning data, etc. Metadata may also comprise external data sources like databases (e.g. material manufacturers, models etc.), information from Internet, social network information, etc.

Metadata may be used in the spectral analysis for restricting the search of salient/abnormal pixels to specific conditions represented by said metadata. Examples of such restrictive conditions may refer to e.g. particular regions of interest, acquisition time of the image, etc. This approach may permit optimizing the computational resources used to perform the spectral analysis, since the search of salient pixels may be constrained to precise preconditions (e.g. spatial, temporal . . . conditions). Metadata may be received along with the image(s) to be analysed as part of the image(s) or as extra data linked someway to the image(s).

Metadata of interest may also result from the execution of any of the primary/secondary classifications. For example, the primary or the secondary classification may classify a target as confirmed target in a certain location which may be of interest to be monitored. This way, a confirmed target and its metadata (e.g. its position or Region of Interest ROI) may be classified as a point of interest to be monitored. In later executions of the primary/secondary classification(s) or the overall method itself, this point of interest (or ROI or SSOI) may be monitored to detect changes produced over time at said point/region. Alarms/warnings may be generated to alert about said changes over time. In the same or similar way, a SSOI that has been identified and classified as confirmed target may be used as input of e.g. a spectral search engine dedicated to search SSOIs similar to the inputted SSOI. This search may be performed depending on constraints (e.g. ROI, LoC etc.) similar to those associated with the inputted SSOI.

Spectral analysis may be performed (by primary classification algorithm) based on Artificial Intelligence (e.g. machine learning) techniques. Artificial Intelligence may be implemented based on machine learning algorithms which may be supervised, unsupervised or semi-supervised. Machine learning algorithms may use predefined training data which may comprise predefined spectral signatures (tags). These predefined spectral signatures may be used as patterns or models to be compared with groups of salient pixels for determining if said salient pixels may correspond to a SSOI. These predefined spectral signatures may be retrieved from a repository included in the system that is performing the spectral analysis or may be received from another system that may be remote or not. Neural networks are an example of machine learning algorithms that may be used with acceptable results.

A library/database (or similar) including predefined spectral signatures (or known tags) may be used for determining whether detected salient pixels may correspond to SSOIs. Said known tags may be expressed in e.g. reflectance values, which may be converted to radiance values if required. In the case that, for example, image(s) to be analysed are multispectral images with values expressed in radiance, such a conversion of the known tags from reflectance to radiance values may be required. Said conversion may take into account ad hoc mission data.

Mission data may include environmental conditions that may potentially influence the spectral conditions in the image(s) under analysis. Examples of mission data may include insolation, scattered background radiance, upwelling atmospheric radiance etc. which may be used to generate a modelled signature as seen at the top of the atmosphere (TOA) by the sensor/camera. Top of Atmosphere (TOA) approach is a well-known concept in the field, so no detailed information about it is provided in the present disclosure.

Values/tags of the image(s) may be compared (at block 3020) to predefined spectral signatures using corresponding classification algorithm that may include machine learning (or not). If a coincidence of values/tags between the image (under analysis) and predefined spectral signatures is determined to have an accuracy of e.g. 99.99%, salient pixels associated with such tags in the image may be assumed as corresponding to an identified target. In the case of accuracies (confidences) below 99.99%, corresponding pixels may be subjected to further processing (e.g. spectral, geometrical analysis at block 3040) for confirming or discarding them as identified targets. Other accuracy/confidence thresholds different from 99.99% may be considered depending on the application. As commented in later descriptions, accuracy/confidence determination and evaluation may be performed at block 3030.

Spectral analysis (performed by primary classification algorithm) may further comprise, at block 3020, enriching the generated SSOIs by attributing metadata generated during the spectral analysis to the SSOIs. Examples of said metadata are any metadata of the image(s) from which SSOIs have been produced, tag descriptors, etc.

Block 3020 may be performed by e.g. the spectral analysis module 2010 of FIG. 2b. Once block 3020 has been completed, a transition to next block 3030 may be undertaken.

At block 3030, a verification of whether SSOIs from previous block 3020 have enough confidence may be performed. Block 3030 may thus comprise determining a (level of) confidence for each of the received SSOIs and/or backgrounds, and verifying whether each of said confidences is below or above a confidence threshold.

If no SSOIs have been generated at block 3020, the level of confidence may be determined depending on a level of correspondence/correlation/similarity between (parts of) the image and predefined patterns. This level of correspondence may have been determined at previous block 3020.

A confidence threshold may be predefined higher or lower depending on the application. For example, higher confidence levels may be required in search and rescue applications in comparison with less critical target recognition applications.

Confidence threshold(s) may also depend on available computational power and quality of the image(s). Confidence may be adjusted during classification process (i.e. spectral analysis) depending on available computational power and/or distribution of computational load between different classification processes in the overall method. For example, distribution of computational load between different classifications may comprise distribution of computational load between the spectral classification performed at block 3020 and the further classification performed at block 3040. LoCs may be re-adjusted during execution(s) of the classification (and of the overall method), and may be used to decide iterating some of the primary and secondary classifications, both classifications, or part of the classifications.

If no SSOIs have been detected by the primary (pre-) classification (at block 3020), such an absence of SSOIs may also provide relevant information to the secondary classification (at block 3040). For example, the secondary classification may be performed based on non-spectral analysis when no interesting spectral features have been detected in the spectral analysis of the primary classification. In this case, non-spectral (e.g. geometric) features may be considered by the secondary classification (at block 3040).

In some examples, if background portions (e.g. pixels around SSOI or potential target) are determined to have enough LoC (at block 3030), said background parts may be eliminated to avoid its processing by the secondary classification (block 3040). That is, not only potential targets may be identified (and further processed if required) but background portions without relevant features may be discarded to cause reduction of data to be processed by the secondary classification (block 3040).

In further examples, a level of integrity/non-integrity (or continuity/discontinuity) of tags representing spectral features may also provide relevant information. A given SSOI that has been spectrally pre-classified at block 3020 may be further processed at same block 3020 to verify whether the SSOI includes some (level of) discontinuity in the spectral features represented by corresponding tags in the SSOI. This SSOI may correspond to a confirmed target or not. A verification of the size of the tags and/or of whether integrity between the tags is complete or incomplete may have been performed, with the aim of e.g. detecting distorted portions of an object. A certain level of non-integrity may correspond to a discontinuity in spectral conditions that may reveal corrosion, lack of material, loss of spectral properties of the material, or similar distortion in/on the object. At block 3050, a LoC of the integrity analysis performed at block 3020 may be determined depending on e.g. a correspondence between confirmed or potential target(s) and corresponding predefined patterns. For instance, corroded areas (or areas affected by corrosion) in/on a wind turbine blade may be detected with the proposed solution.

If the LoC of a given level of integrity/non-integrity has been determined as enough at block 3030, said level of integrity/non-integrity may be compared with an integrity threshold to determine if the integrity/non-integrity is enough or not. If a significant level of non-integrity is detected in a SSOI that has been previously confirmed as identified target, a warning may be generated to alert about said significant level of non-integrity in the confirmed target. Said comparison between the level of integrity and corresponding threshold may be performed after completion of block 3030, or as a final step within block 3030.

Block 3030 may be performed by e.g. the results module 2030 (of FIG. 2*b*) once SSOIs have been determined (or not) at previous block 3020.

If enough (level of) confidence has been determined at block 3030, the method may continue to final block 3060 for terminating the execution of the method because SSOIs with enough confidence may be assumed as confirmed targets. Otherwise, a progression to block 3040 may be performed to initiate a further analysis of either SSOIs from block 3020 or, if no SSOIs have been produced, the image(s) under analysis.

At block 3040, a further analysis may be performed (by secondary classification algorithm) on at least some SSOIs with not enough confidence from block 3020. If no SSOIs have been generated at block 3020, said further analysis may be performed on the whole image which may have been enriched at block 3020. This further analysis may comprise e.g. performing known classification methods based on spectral and/or non-spectral parameters of the image(s). Examples of non-spectral parameters may be e.g. geometrical parameters relating to shape, size, etc. With respect to spectral parameters, same or similar parameters to those employed in the spectral analysis of block 3020 may be considered in the further analysis of block 3040. In this case, however, more powerful classification algorithms may be employed to increase accuracy with respect to the spectral analysis of block 3020.

Taking this into account, the spectral analysis performed at block 3020 may be seen as a pre-classification to determine SSOIs (if possible) under less powerful classification algorithm(s). A given SSOI may have been assumed as confirmed target if enough confidence has been estimated for said SSOI at e.g. block 3030. A particular SSOI may have been assumed simply as candidate to target if not enough confidence has been estimated for said SSOI at block 3030. A candidate to target may be defined herein as a cluster/group of pixels or region of interest (ROI) in the image that may potentially correspond to a target. As commented in other parts of the description, backgrounds (of interest) may also be classified by primary classification (block 3020) and, if necessary, further processed by secondary classification (block 3040). In this sense, backgrounds may be seen as a type of target to be also classified as confirmed target (confirmed background in the case of backgrounds). Hence, all or most of the considerations indicated with respect to the identification of targets may be applicable to the identification of backgrounds.

This approach based on less computationally demanding analysis on the whole image (block 3020) and more computationally demanding analysis on parts (e.g. SSOIs) of the image (block 3040) may result in a more efficient overall method in comparison with prior art methods of same or similar type.

Processing the whole image may imply processing large quantities of pixels and thus a high computational cost, which may be attenuated by using a less computationally demanding algorithm as a pre-classifier of the image (at block 3020). Then, certain parts or SSOIs of the image (from block 3020) with not enough confidence may be processed by a more computationally demanding algorithm (at block 3040) to compensate for the less accuracy provided by previous block 3020. This increase of accuracy (at block 3040 with respect to block 3020) may cause that SSOIs not classified as identified targets before the execution of block 3040 may become identified targets once having been processed by block 3040. Since the more computationally demanding algorithm is normally performed only on parts of the image, the overall method may result more efficient especially in the case that very large images are to be processed.

The further analysis may be performed (at block 3040) based on Artificial Intelligence implemented with e.g. machine learning algorithms which may be supervised, unsupervised or semi-supervised. Machine learning algorithms may use predefined spectral or non-spectral training data. Neural networks are examples of machine learning algorithms that may be used with acceptable results. Foundations about machine learning and training data similar to those provided with respect to block 3020 may also be assumed in the case of block 3040. As commented before, in some examples, block 3020 may include less computationally demanding methods (e.g. non machine learning algorithms or non-deep machine learning algorithms), and block 3040 may include more computationally demanding methods (e.g. deep machine learning algorithms).

In other examples, the primary classification (block 3020) may process a SAR image and the secondary classification may process a multispectral image or parts of the image depending on the results of the primary classification. In this particular case, the primary classification may pre-classify the SAR image depending on radar features and the secondary classification may classify the multispectral image or parts of said image depending on optical features. These parts of the multispectral image may correspond to parts of the SAR image that have determined by the primary (pre-) classification as portions that may correspond to potential targets.

Metadata associated to the received SSOIs (or images) may also be used to perform the further analysis (by secondary classification algorithm). Principles about metadata similar to those provided with respect to block 3020 may also be considered in the case of block 3040.

In some examples, the further analysis may be performed (at block 3040) based on non-spectral features of e.g. panchromatic (PAN) images which are black/white images. Said PAN image(s) may have been acquired along with corresponding RGB (red, green, blue) multispectral image(s). Such an approach may thus be based on spectrally analysing e.g. colour features of the multispectral image(s) (at block 3020) and, afterwards, analysing e.g. geometric features of the PAN (black/white) image(s) (at block 3040) to confirm or discard SSOIs as possible targets. Colour features may refer to spectral features including the non-visible spectrum, i.e. infrared (IR) spectrum.

The overall target identification method may thus comprise a shallow spectral analysis (primary classification) of a heavy image (multispectral image) and a deeper analysis (secondary classification) of parts of a much less heavy image (PAN image). Said deeper analysis may be performed by the secondary classification considering non-spectral features such as e.g. geometric features (contours, shapes, etc.) on parts of the PAN image corresponding to portions of the multispectral image in which a SSOI has been determined by the primary classification. This approach may thus permit optimizing the computational cost when e.g. inspecting image(s) of significantly extensive area(s) in comparison with performing both spectral and further analysis on multispectral image(s).

The further analysis (performed by secondary classification algorithm) may additionally comprise enriching the candidates to target by attributing metadata generated during the further analysis to the candidates (to be target). Examples of said metadata are any metadata of the SSOIs or image(s) from which candidates have been produced, tag descriptors, etc.

Block 3040 may be performed by e.g. the further analysis module 2020 of FIG. 2b.

Once block 3040 has been completed, the method may transition to next block 3050. A loop back from block 3040 to block 3020 may also be performed, depending on circumstances.

At block 3050, a verification of whether candidates to target from previous block 3040 have enough confidence may be performed. Block 3050 may thus comprise determining a confidence for each of the received candidates, and verifying whether each of said confidences is below or above a confidence threshold. Similar confidence-related principles to those commented in other parts of the disclosure may also be applied in the case of block 3050. If no candidates have been generated at block 3040, it may be assumed that all the analysed image or parts of the image correspond to background, in the case that the LoC attributed to the image or parts of the image is greater than predefined threshold. Otherwise, if the LoC of the image or parts of the image is less than the threshold, a new iteration may be performed which may be based on a greater LoC requirement.

If enough confidence has been determined at block 3050, the method may continue to final block 3060 for terminating execution of the method because candidates with enough confidence may be assumed as confirmed targets. Otherwise, the method may loop back to block 3040 to initiate a new further analysis taking into account parameter(s) or combination of parameters different from those considered in previous iterations. In alternative examples, a loop back from block 3050 to block 3020 may be performed to initiate a new spectral analysis taking into account spectral parameters or combination of spectral parameters different from those considered in previous iterations.

A level of integrity/non-integrity (or continuity/discontinuity) of tags representing spectral or non-spectral features may be received by block 3050 from block 3040. A confirmed or potential target from block 3040 may have been further processed (at same block 3040) to verify whether the confirmed/potential target includes some (level of) discontinuity in its spectral features. A verification of the size of the tags and/or of whether integrity between the tags is complete or incomplete may have been performed, with the aim of e.g. detecting distorted portions of an object. A certain level of non-integrity may correspond to a discontinuity in spectral or non-spectral conditions that may reveal corrosion, lack of material, loss of spectral properties of the material or similar distortion in/on the object. At block 3050, a LoC of the integrity analysis performed at block 3040 may be determined depending on e.g. a correspondence between confirmed/potential target(s) and corresponding predefined patterns. For instance, corrosive parts in a wind turbine blade may be detected with the proposed solution.

If the LoC of a given level of integrity/non-integrity has been determined enough at block 3050, said level of integrity/non-integrity may be compared with an integrity threshold to determine if the integrity/non-integrity is excessive or not. If a significant level of non-integrity is detected in a confirmed target, a warning may be generated to alert about said excessive level of non-integrity in the confirmed target. Said comparison between the level of integrity and corresponding threshold may be performed after completion of block 3050, or as a final step within block 3050.

Block 3050 may be performed by e.g. the results module 2030 (of FIG. 2b) once candidates have been determined (or not) at previous block 3040.

At block 3060, the target identification method may be terminated by producing result data from SSOIs and/or candidates with enough confidence and, in some examples, said result data may be sent to corresponding device/site/station for further processing of the result data. Said further processing may include e.g. displaying result data on suitable display, other types of analysis such as e.g. multidimensional or datamining analysis, etc. Result data may be produced by results module 2030, and the sending of said data may be performed by interface module 2040 (see FIG. 2b).

Figure 4:
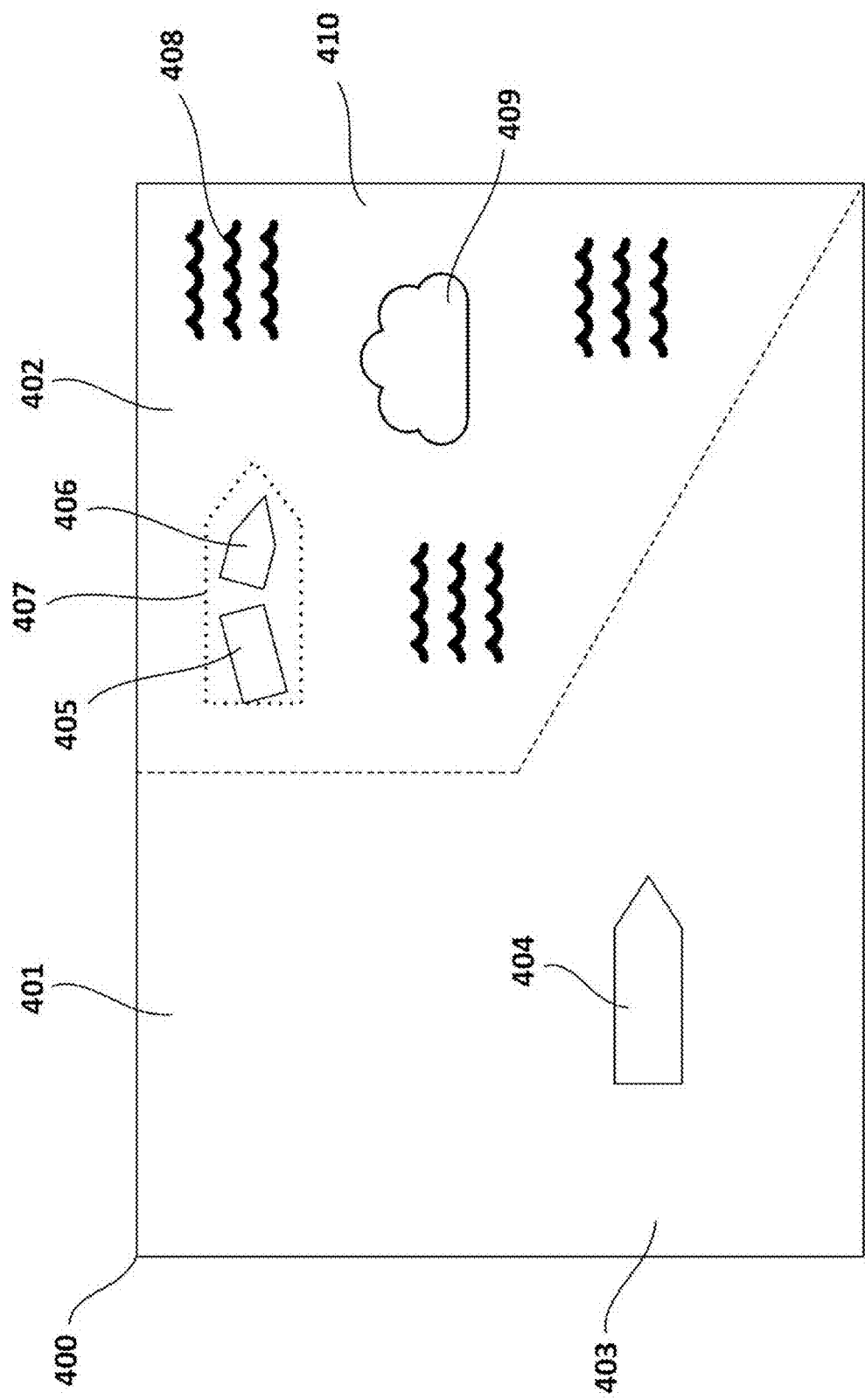
FIG. 4 is a schematic representation of an image including an artificial target on undistorted background and an artificial target on distorted background, said image to be processed by an artificial target detection system/method such as the ones of FIGS. 1, 2a and 3a or a schematic representation of an image including a target on undistorted background and a target on distorted background.

FIG. 4 may be a schematic representation of an image 400 including an artificial target 404 on undistorted background 403 and an artificial target 405, 406 on distorted background 410. This image may be processed by methods according to present disclosure such as e.g. the method described with reference to FIG. 3a. Number references from FIG. 3a may thus be used in following description of FIG. 4.

The image 400 may be divided into a plurality of image regions according to e.g. a grid-based approach, so that the whole (or most of the) image is covered by the grid. The method may be iteratively performed so that each of the image regions is processed by corresponding iteration of the method.

Primary classification based on e.g. spectral analysis (block 302) may identify, at different iterations processing different image regions, two different portions 401, 402 in the image 400 that may correspond to portions including possible artificial target and surrounding background.

Portion 401 may include a group of salient pixels 404 and background pixels 403 that may correspond to spectral signature(s) or feature(s) corresponding to a ship and surrounding sea water. The ship may be coated with e.g. a coating/material/sticker with spectral properties in the infrared. The sea 403 surrounding the ship 404 may not be distorted by e.g. clouds, weaves, etc. Thus, the spectral feature(s) corresponding to the ship 404 may be clearly distinguished from the background 403 according to principles described in other parts of the description. In this sense, high LoCs may be attributed by the spectral analysis to the group of salient pixels corresponding to the ship 404, while low LoCs may be attributed to (at least some of) the pixels corresponding to the background (sea). A confidence (or LoC) may be determined from a relation (deviation, correspondence, correlation, etc.) between features extracted from image region and corresponding spectral profile.

Taking the above into account, a first LoC of e.g. 99.5% may be attributed to salient pixels 404 and a first LoC of e.g. 40% may be attributed to background pixels 403 at block 303. A first predetermined confirmation level of e.g. 99% and a first predetermined minimum acceptance level of e.g. 50% may be considered to evaluate first LoCs. Salient pixels 404 may be assumed as confirmed artificial target without the need of further processing, since the first LoC of the salient pixels 404 is greater than the first predetermined confirmation level (99.5%>99%). Similarly, background pixels 403 may be assumed as sea water surrounding the target ship 404, since the first LoC of the background pixels 403 is less than the first predetermined minimum acceptance level (40%<50%). Background pixels 403 may hence be suppressed from image region in order to avoid further processing of said background pixels 403.

Region 402 may include a group of salient pixels 405, 406 and background pixels 410 that may correspond to a ship and surrounding sea water, respectively. In this case, the sea 410 surrounding the ship 405, 406 may be distorted by e.g. clouds 409, weaves 408, wakes of ships, etc. Thus, the ship 405, 406 may not be clearly distinguished from the background 410. In this sense, a lower first LoC (in comparison with region 401) may result from the spectral analysis to the group of salient pixels 405, 406 and to (at least some of) the other pixels 410 corresponding to the background (sea).

Taking the above into account, a first LoC of e.g. 70% may be attributed to salient pixels 405, 406 and a first LoC of e.g. 20% may be attributed to background pixels 410 at block 303. Salient pixels 405, 406 cannot be assumed as confirmed artificial target, since the first LoC of the salient pixels 405, 406 is less than first predetermined confirmation level (70%<99%). Salient pixels 405, 406 cannot be confirmed as background because the first LoC of the salient pixels 405, 406 is greater than the first predetermined minimum acceptance level (70%>50%). Background pixels 410 may be directly confirmed as background because the first LoC of the (background) pixels 410 is less than the first predetermined minimum acceptance level (20%<50%). Background pixels 410 may hence be suppressed from image region in order to avoid further processing of said background pixels 410.

Given the above situation, a further analysis of only the region 402 may be performed at block 304 (secondary classification). It is worthy of mention that secondary classification may not receive the background pixels 410 which have been suppressed from image region (at block 302). This further analysis may consider, in a first execution, geometrical parameters to evaluate whether salient pixels 405, 406 may correspond to an artificial target. Geometrical analysis may thus be performed based on e.g. comparing the salient pixels 405, 406 with models or patterns of shapes, sizes, etc. In the particular example shown, the salient pixels 405, 406 may substantially match a predefined shape pattern 407 corresponding to a ship, so that a high second LoC of e.g. 95% may be attributed to the salient pixels 405, 406 (at block 305).

At block 305, a second predetermined confirmation level of e.g. 99% may be considered to determine whether salient pixels 405, 406 may correspond to target ship. Therefore, salient pixels 405, 406 may not be classified as confirmed artificial target, since the second LoC of salient pixels 405, 406 is less than the second predetermined confirmation level (95%<99%). In this case, image region may be further processed e.g. in following manner. A loop back to block 304 may be performed to initiate a further execution of the secondary classification taking into account e.g. parameters unconsidered in previous execution(s) of the secondary classification. Alternatively, a loop back to block 302 may be carried out to initiate a further execution of the primary classification taking into account e.g. parameter value(s) or LoC value(s) or parameters not considered in preceding execution(s) of the primary classification.

In the case of looping back to block 304, a deeper (more detailed) analysis may be performed depending on e.g. more parametric variables (already used or not) in order to minimize/avoid distortions possibly caused by e.g. clouds 409, waves 408, etc. For example, this deeper and more detailed analysis may include a deep machine learning based on multiple features. This deeper analysis may improve the identification of the salient pixels 405, 406 as the target ship, so a higher second LoC of e.g. 99.9% may be attributed to the salient pixels 405, 406 (at block 305). Since the second LoC of 99.9% attributed to the salient pixels 405, 406 is greater than the second predetermined confirmation level (99.9%>99%), the salient pixels 405, 406 may be confirmed as artificial target. At this point, iterations of the artificial target detection method may be ended since all image regions from (different iterations of) block 302 have been identified as corresponding artificial targets (and suppressed background).

Inventors identified that following target identifying methods characterized by indicated features produced especially good results in terms of both accuracy (in results) and efficiency (in use of computational resources).

Example 1

IMAGE: multispectral/PAN
TAG MODE: tag presence (see explanation below)
ACQUISITION MODE: scan (see explanation below)
PRIMARY CLASSIFICATION: non machine learning, on-board, real-time
SECONDARY CLASSIFICATION: supervised machine learning, ground segment (or station), non-real time, PAN image (geometrically driven)

Example 2

IMAGE: multispectral
TAG MODE: tag absence (see explanation below)
ACQUISITION MODE: search (see explanation below)
PRIMARY CLASSIFICATION: non machine learning, on-board, real-time
SECONDARY CLASSIFICATION: supervised machine learning, on-board, real-time Example 3

IMAGE: multispectral
TAG MODE: tag presence (see explanation below)
ACQUISITION MODE: scan (see explanation below)
PRIMARY CLASSIFICATION: supervised machine learning, on-board, real-time
SECONDARY CLASSIFICATION: supervised machine learning, on-board, real-time Example 4

IMAGE: SAR/multispectral
TAG MODE: tag presence (see explanation below)
ACQUISITION MODE: scan (see explanation below)
PRIMARY CLASSIFICATION: supervised machine learning, on-board, real-time
SECONDARY CLASSIFICATION: supervised machine learning, on-board, real-time TAG MODE may be defined herein as a general principle under which the image is analysed in both spectral and further analysis. As commented in other parts of the description, pixels or groups of pixels may be tagged during analysis with values attributing them particular features, such as e.g. level of radiance, salience, geometry, confidence, colour, etc. Tag presence mode may correspond to identifying/interpreting pixels or groups of pixels based on determining the presence of given tags associated to the pixels. Tag absence mode may correspond to identifying/interpreting pixels or groups of pixels based on determining the absence of given tags associated to the pixels. Tag absence mode may be used to detect/analyse certain ROIs or to monitor (changes over time in) spectral signatures/features. Tag change mode (or change monitoring mode) may correspond to monitoring previously identified spectral signatures/features for detecting changes in said spectral signatures/features over time. Tag integrity mode may correspond to determining a level of integrity associated to spectral signatures/features according to "integrity" principles described in other parts of the disclosure.

ACQUISITION MODE may be defined herein as a general principle under which the images are acquired or captured by a sensor or camera (or any type of image capturing device) installed on corresponding vehicle, portable device, etc. Scan mode may refer to that said vehicle/device is programmed in a periodic way to scan certain areas of the earth with a certain revisit time. Search and locate mode may refer to that said vehicle/device is operated to search for particular areas (or locations) of the earth and/or particular times or features, and acquire images of said selected areas. Image(s) to be analysed may be retrieved from other sources such as e.g. databases, Internet, image platforms, etc.

Another type of methods that may be denominated "integrity" methods may also be provided for verifying the integrity of a confirmed artificial target obtained by any of the "detection" methods described with respect to FIGS. 3 and 4. A level of integrity/non-integrity (or continuity/discontinuity) of e.g. tags representing extracted spectral features may also provide relevant information. Integrity methods may be structurally similar to detection methods described with reference to FIGS. 3 and 4. Integrity methods may comprise applying (at e.g. block 302) the primary classification to the confirmed artificial target for determining if the confirmed artificial target comprises a discontinuity in its spectral signature. The primary classification may be based on spectral and, in some cases, spatial analysis. A third LoC of a potential discontinuity detected by the primary classification may be determined (at e.g. block 303) and it may be verified whether said third LoC is sufficient or insufficient, or even very insufficient.

Third LoC may be determined at block 303 as being sufficient, insufficient or very insufficient according to any of the following criteria. If third LoC is greater than third predetermined confirmation level, third LoC may be assumed as being sufficient. If third LoC is lower than third predetermined confirmation level and higher than third predetermined minimum acceptance level, third LoC may be assumed as being "simply" insufficient. If third LoC is lower than third predetermined minimum acceptance level, third LoC may be assumed as being very insufficient. If third LoC results to be sufficient, potential discontinuity may be determined as confirmed discontinuity. If third LoC results to be very insufficient, potential discontinuity may be determined as not being discontinuity. If third LoC results to be "simply" insufficient, potential discontinuity may be determined as candidate to be discontinuity and, therefore, further processing may be performed. Further processing of the potential discontinuity may be performed by repeating primary classification (block 302) with another configuration, or by executing secondary classification (block 304). If potential discontinuity is classified as confirmed discontinuity, a warning may be generated indicating existence of the confirmed discontinuity.

If potential discontinuity needs further processing because third LoC has been determined as being insufficient, secondary classification (block 304) may be applied to the confirmed artificial target. A fourth LoC of the application of the secondary classification may be determined (at e.g. block 305) and it may be verified whether said fourth LoC is sufficient or insufficient, or even very insufficient according to any of the following criteria. If fourth LoC is greater than fourth predetermined confirmation level, fourth LoC may be assumed as being sufficient. If fourth LoC is lower than fourth predetermined confirmation level and higher than fourth predetermined minimum acceptance level, fourth LoC may be assumed as being "simply" insufficient. If fourth LoC is lower than fourth predetermined minimum acceptance level, fourth LoC may be assumed as being very insufficient. If fourth LoC results to be sufficient, potential discontinuity may be determined as confirmed discontinuity. If fourth LoC results to be very insufficient, potential discontinuity may be determined as not being discontinuity. If fourth LoC results to be insufficient, potential discontinuity may be determined as candidate to be discontinuity and, therefore, further processing may be performed. Further processing of the potential discontinuity may be performed by repeating secondary classification (block 304) with another configuration (e.g. not used before) or by looping back to primary classification (block 302). If potential discontinuity is finally classified as confirmed discontinuity, a warning may be generated indicating existence of the confirmed discontinuity.

Integrity methods may permit verifying whether integrity between tags (or pixels) is complete or incomplete, with the aim of e.g. detecting distorted portions of an object (e.g. artificial target). A certain level of non-integrity may correspond to a discontinuity in spectral conditions that may reveal corrosion, lack of material, loss of spectral properties of the material, or similar distortion in/on the object. Any of the third and fourth LoCs may be determined depending on e.g. a correspondence between confirmed artificial target and corresponding predefined patterns. For instance, corroded areas (i.e. affected by corrosion) in/on a wind turbine blade may be detected with the proposed solution.

In any of the described detection and integrity methods, first, second, third and fourth predetermined confirmation levels, and first, second, third and fourth predetermined minimum acceptance levels may be generally denominated as confidence thresholds. Such thresholds may be predefined also depending on available computational power and quality of the image(s). First, second, third and fourth LoCs may be adjusted during classification processes depending on available computational power and/or distribution of computational load between the classification processes within the overall method. For example, distribution of computational load between different classifications may comprise distribution of computational load between primary classification and secondary classification. First, second, third and fourth LoCs may be re-adjusted during execution(s) of the classifications (and of the overall method), and may be used to decide repeating some of the primary and secondary classifications, both classifications, or part of the classifications.

In any of the described detection/integrity methods, different levels of information may be outputted by the primary classification and by the secondary classification. For example, a class hierarchy may be produced by the primary classification and a subclass hierarchy may be produced by the secondary classification. For the sake of understanding, conceptually suggestive class and subclass hierarchies may be considered comprising e.g. the type of target, manufacturer, model, etc. For instance, the primary classification may produce a class hierarchy including the type of the confirmed artificial target (e.g. 'car') and the manufacturer of the confirmed artificial target (e.g. "Volkswagen"), and the secondary classification may produce a subclass hierarchy including the model of the confirmed artificial target (e.g. 'VW Passat 2015').

In any of the described detection/integrity methods, metadata, mission data, tags, descriptors, etc. may be generally used in same or similar manner as described in other parts of the disclosure with respect to particular example(s).

FIG. 4 may be a further schematic representation of an image 400 including a target 404 on undistorted background 403 and a target 405, 406 on distorted background 410. This image may be processed by methods according to present disclosure such as e.g. the method described with reference to FIG. 3b. Number references from FIG. 3b may thus be used in following description of FIG. 4.

A pre-classification sub-method based on spectral analysis (block 3020) may identify two different regions 401, 402 in the image 400 that may correspond to possible target and associated background.

Region 401 may include a group of salient pixels 404 and background pixels 403 that may correspond to a spectral signature of a ship and surrounding sea water. In this case, the sea 403 surrounding the ship 404 may not be distorted by e.g. clouds, weaves, etc. Thus, the spectral signature of the ship 404 may be clearly distinguished from the background 403 according to principles described in other parts of the description. In this sense, high confidences may be attributed by the spectral analysis to the group of salient pixels corresponding to the ship 404 and to (at least some of) the pixels corresponding to the background (sea).

Taking the above into account, a confidence of e.g. 95% may be attributed to salient pixels 404 and a confidence of e.g. 97% may be attributed to background pixels 403 at block 3030, which may consider a confidence threshold of e.g. 90%. In this particular case, the salient pixels 404 may be assumed as confirmed target without the need of further processing, since the confidence of the salient pixels 404 is greater than the confidence threshold (95%>90%). Similarly, background pixels 403 may be assumed as sea water surrounding the target ship 404, since the confidence of the background pixels 403 is greater than the confidence threshold (97%>90%). I this case, since the LoC of the background is enough, suppression of the background may be performed in the context of methods according to the present disclosure.

Region 402 may include a group of salient pixels 405, 406 and background pixels 410 that may correspond to a ship and surrounding sea water. In this case, the sea 410 surrounding the ship 405, 406 may be distorted by e.g. clouds 409, weaves 408, wakes of ships, etc. Thus, the ship 405, 406 may not be clearly distinguished from the background 410 according to principles described in other parts of the description. In this sense, lower confidences (in comparison with region 401) may be attributed by the spectral analysis to the group of salient pixels 405, 406 and to (at least some of) the other pixels 410 corresponding to the background (sea).

Taking the above into account, a confidence of e.g. 30% may be attributed to salient pixels 405, 406 and a confidence of e.g. 40% may be attributed to background pixels 410 at block 3030. Therefore, the salient pixels 405, 406 cannot be assumed as confirmed target, since the confidence of the salient pixels 405, 406 is less than the confidence threshold (30%<90%). Similarly, background pixels 410 cannot be assumed as sea water surrounding the target ship 405, 406, since the confidence of the background pixels 410 is less than the confidence threshold (40%>90%).

Given the above situation, a further analysis of only the region 402 may be performed at block 3040. This further analysis may consider, in a first iteration, geometrical parameters to evaluate whether salient pixels 405, 406 may correspond to a target. Geometrical analysis may thus be performed based on e.g. comparing the salient pixels 405, 406 with models or patterns of shapes, sizes, etc.

In the particular example shown, the salient pixels 405, 406 may substantially match a predefined shape pattern 407 corresponding to a ship, so that a high confidence of e.g. 95% may be attributed to the salient pixels 405, 406 at block 3050. However, the background pixels may be less identifiable when geometric parameters are considered due to the distortion caused by e.g. clouds 409, waves 408, etc. Therefore, a lower confidence of e.g. 91% may be attributed to the background pixels 410 at block 3050.

At block 3050, a confidence threshold of e.g. 94% may be considered to determine whether salient and background pixels may correspond to target ship and surrounding sea water, respectively. Therefore, the salient pixels 405, 406 may be assumed as confirmed target, since the confidence of the salient pixels 405, 406 is greater than the confidence threshold (95%>94%). However, background pixels 410 cannot be assumed as sea water surrounding the target ship 405, 406, since the confidence of the background pixels 410 is less than the confidence threshold (91%<94%). Accordingly, a loop back to block 3040 may be performed to initiate a second iteration of the further analysis taking into account e.g. parameters unconsidered in previous (first) iteration.

In such a second execution of block 3040, a deeper (more detailed) analysis may be performed depending on e.g. more parametric variables (already used or not) in order to minimize/avoid distortions possibly caused by e.g. clouds 409, waves 408, etc. For example, this deeper and more detailed analysis may include a deep machine learning based on multiple features. This deeper analysis may improve the identification of the background pixels 410 as sea water surrounding the target ship 405, 406, so a higher confidence of e.g. 95% may be attributed to the background 410 at block 3030. Since the LoC of 95% attributed to the background 410 is greater than the confidence threshold (95%>94%), this background 410 may be suppressed. At this point, the target identification method may be terminated since all candidates from pre-classification block 3020 have been identified as corresponding targets (region 405, 406 identified in first iteration of blocks 3040 and 3050) and suppressed background (the region 410 identified in second iteration of blocks 3040 and 305).

Inventors have identified that following target identifying methods characterized by indicated features have produced especially good results in terms of both accuracy (in results) and efficiency (in use of computational resources).

Example 1

IMAGE: multispectral/PAN
TAG MODE: tag presence (see explanation below)
ACQUISITION MODE: scan (see explanation below)
SPECTRAL ANALYSIS: non machine learning, on-board, real-time
FURTHER ANALYSIS: supervised machine learning, ground segment (or station), non-real time, PAN image (geometrically driven)

Example 2

IMAGE: multispectral
TAG MODE: tag absence (see explanation below)
ACQUISITION MODE: search (see explanation below)
SPECTRAL ANALYSIS: non machine learning, on-board, real-time
FURTHER ANALYSIS: supervised machine learning, on-board, real-time Example 3

IMAGE: multispectral
TAG MODE: tag presence (see explanation below)
ACQUISITION MODE: scan (see explanation below)
SPECTRAL ANALYSIS: supervised machine learning, on-board, real-time
FURTHER ANALYSIS: supervised machine learning, on-board, real-time Example 4

IMAGE: SAR/multispectral
TAG MODE: tag presence (see explanation below)
ACQUISITION MODE: scan (see explanation below)
SPECTRAL ANALYSIS: supervised machine learning, on-board, real-time
FURTHER ANALYSIS: supervised machine learning, on-board, real-time TAG MODE may be defined herein as a general principle under which the image is analysed in both spectral and further analysis. As commented in other parts of the description, pixels or groups of pixels may be tagged during analysis with values attributing them particular features, such as e.g. level of radiance, salience, geometry, confidence, colour, etc. Tag presence mode may correspond to identifying/interpreting pixels or groups of pixels based on determining the presence of given tags associated to the pixels. Tag absence mode may correspond to identifying/interpreting pixels or groups of pixels based on determining the absence of given tags associated to the pixels. Tag absence mode may be used to detect/analyse certain ROIs or to monitor (changes over time in) SSOIs. Tag change mode (or tag change monitoring mode) may correspond to monitoring previously identified SSOIs for detecting changes in said SSOIs over time. Tag integrity mode may correspond to determining a level of integrity associated to SSOIs according to "integrity" principles described in other parts of the disclosure.

ACQUISITION MODE may be defined herein as a general principle under which the images are acquired or captured by a sensor or camera (or any type of image capturing device) installed on corresponding vehicle, portable device, etc. Scan mode may refer to that said vehicle/device is programmed in a periodic way to scan certain areas of the earth with a certain revisit time. Search mode may refer to that said vehicle/device is operated to search for particular areas of the earth and/or particular times or features, and acquire images of said selected areas. Image(s) to be analysed may be retrieved from other sources such as e.g. databases, Internet, image platforms, etc.

In any of the described examples, different levels of information may be outputted by the primary classification (block 3020) and by the secondary classification (block 3040). For example, a class hierarchy may be produced by the primary classification and a subclass hierarchy may be produced by the secondary classification. For the sake of understanding, conceptually suggestive class and subclass hierarchies may be considered comprising e.g. the type of target, manufacturer, model, etc. For instance, the primary classification may produce a class hierarchy including the type of the identified target (e.g. 'car') and the manufacturer of the identified target (e.g. "Volkswagen'), and the secondary classification may produce a subclass hierarchy including the model of the identified target (e.g. 'VW Passat 2015').

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method of detecting an artificial target within an image, the method comprising:
applying to a region of the image a primary classification algorithm for performing a feature extraction of the image region, the primary classification algorithm being based on a spectral profile of a coating applied to the artificial target, the coating comprising one or more spectral signatures in at least part of the infrared spectrum, and the one or more spectral signatures comprising scattered infrared radiation;
obtaining a relation between one or more extracted features of the image region and the spectral profile;
when a first level of confidence of the obtained relation between the one or more extracted features and the spectral profile is higher than a first predetermined confirmation level:
determining that the image region corresponds to an artificial target to be detected, thereby obtaining a confirmed artificial target.

2. The method according to claim 1, wherein the primary classification algorithm is also based on a spatial profile.

3. The method according to claim 1, wherein the spectral profile is extracted from the image.

4. The method according to claim 1, further comprising:
obtaining predefined spectral data;
applying to the region of the image the primary classification algorithm so that the spectral profile is further extracted from at least one obtained predefined spectral datum.

5. The method according to claim 1, wherein the primary classification algorithm is trained, using predefined data, to identify the spectral profile of the coating.

6. The method according to claim 5, wherein the predefined training data comprises spectral data of a material artificially attributed to the artificial target that modifies original spectral properties of the artificial target.

7. The method according to claim 1, further comprising:
assigning metadata to at least one of the following:
the image;
the image region.

8. The method according to claim 1, further comprising:
receiving metadata;
applying to the image region the primary classification algorithm further based on the obtained metadata.

9. The method according to claim 8, wherein metadata comprises one or more of:
data of the image region;
time of acquisition data;
geo-positioning data;
Point of Interest (POI);
POI for monitoring;
Region of Interest (ROI);
ROI for monitoring;
tag;
tag descriptors data;
spectral signature or spectral feature;
spectral signature or spectral feature descriptors data;
spectral profile;
monitoring data;
external data from databases, Internet, IoT and/or social networks.

10. The method according to claim 1, wherein the primary classification algorithm is executed pixel by pixel.

11. The method according to claim 1, wherein when the first level of confidence of the obtained relation between the one or more extracted features and the spectral profile is lower than a first predetermined minimum acceptance level:
determining that the image region corresponds to background of the image.

12. The method according to claim 1, wherein when the first level of confidence of the obtained relation between the one or more extracted features and the spectral profile is equal to or higher than the first predetermined minimum acceptance level but equal to or lower than the first predetermined confirmation level:
the control of the method goes to step of applying to the image region the primary classification algorithm with a different configuration.

13. The method according to claim 1, wherein when the first level of confidence of the obtained relation between the one or more extracted features and the spectral profile is equal to or higher than the first predetermined minimum acceptance level but equal to or lower than the first predetermined confirmation level:
applying to the image region a secondary classification algorithm based on spectral and/or non-spectral features, the secondary classification algorithm being configured to detect an artificial target within the image region;
when a second level of confidence of the result of applying to the image region the secondary classification algorithm is higher than a second predetermined confirmation level:
determining that the image region corresponds to an artificial target to be detected, thereby obtaining a confirmed artificial target.

14. The method according to claim 13, further comprising, when the second level of confidence of the result of applying to the image region the secondary classification algorithm is higher than the second predetermined confirmation level:
assigning metadata to at least one of the following:
the image;
the image region.

15. The method according to claim 14, further comprising, when the second level of confidence of the result of applying to the image region the secondary classification algorithm is lower than a second predetermined minimum acceptance level:
assigning metadata to at least one of the following:
the image;
the image region.

16. The method according to claim 13, further comprising, when the second level of confidence of the result of applying to the image region the secondary classification algorithm is equal to or higher than the second predetermined minimum acceptance level but equal to or lower than the second predetermined confirmation level:
the control of the method goes to step of applying to the image region the primary classification algorithm with a different configuration.

17. The method according to claim 16, further comprising, when the second level of confidence of the result of applying to the image region the secondary classification algorithm is higher than the second predetermined minimum acceptance level but lower than the second predetermined confirmation level:
assigning metadata to at least one of the following:
the image;
the image region.

18. The method according to claim 13, further comprising, when the second level of confidence of the result of applying to the image region the secondary classification algorithm is higher than the second predetermined minimum acceptance level but lower than the second predetermined confirmation level:
the control of the method goes to step of applying to the image region the secondary classification algorithm with a different configuration.

19. A computing system comprising a memory and a processor, embodying instructions stored in the memory and executable by the processor, the instructions comprising functionality to execute a method according to claim 1 of detecting an artificial target within an image.

20. The method according to claim 1, wherein the spectral image is obtained using light detection and ranging (LIDAR).

21. The method according to claim 1, wherein the one or more spectral signatures correspond to one or more coatings or materials.

22. The method according to claim 1, wherein the one or more spectral signatures comprises a reflectance signature.

23. The method according to claim 1, wherein the first predetermined confirmation level is predetermined using machine learning.

24. The method according to claim 1, wherein the material adheres to the artificial target and has predefined spectral properties in at least part of the infrared spectrum.

25. The method according to claim 1, further comprising:
applying the coating to the artificial target so that only the spectral profile of the coating, and not the original infrared spectral properties of the artificial target, is detectable.

26. A method of detecting a target within an image, the method comprising:
applying to the image a primary classification algorithm based on spectral features;
when a level of confidence of the result of applying to the image the primary classification algorithm based on spectral features is enough:
determining that the result of applying to the image the primary classification algorithm based on spectral features corresponds to at least a target to be detected and/or a background to be detected, obtaining a confirmed target and/or a confirmed background,
wherein information about the spectral features are stored in one or more databases or datasets, and
wherein the primary classification algorithm is trained to identify the spectral features of the target that are different than the target's original spectral features, the spectral features comprised in one or more reflective coatings that scatter energy, thereby resulting in the coating exhibiting the spectral features.

* * * * *